(12) United States Patent
Nose

(10) Patent No.: US 7,830,479 B2
(45) Date of Patent: Nov. 9, 2010

(54) LIQUID CRYSTAL DISPLAY AND ELECTRONIC PAPER UTILIZING THE DISPLAY

(75) Inventor: Masaki Nose, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/551,861

(22) Filed: Sep. 1, 2009

(65) Prior Publication Data
US 2009/0316091 A1    Dec. 24, 2009

Related U.S. Application Data

(63) Continuation of application No. PCT/JP2007/054049, filed on Mar. 2, 2007.

(51) Int. Cl.
*G02F 1/1335* (2006.01)
*C09K 19/02* (2006.01)

(52) U.S. Cl. .......................... 349/115; 349/175; 349/9; 349/137

(58) Field of Classification Search ................. 349/115, 349/175, 9, 137
See application file for complete search history.

(56) References Cited

U.S. PATENT DOCUMENTS

| 7,575,787 B2 * | 8/2009 | Nose et al. ................ 428/1.1 |
| 2005/0024319 A1 | 2/2005 | Amirzadeh et al. | |
| 2009/0244452 A1 * | 10/2009 | Yoshihara et al. ........... 349/115 |

FOREIGN PATENT DOCUMENTS

| JP | 2000-111942 A | | 4/2000 |
| JP | 2000-292777 A | | 10/2000 |
| JP | 2000292777 A | * | 10/2000 |
| JP | 2002-372929 A | | 12/2002 |
| JP | 2007-501422 A | | 1/2007 |
| JP | 2007-501422 T | | 1/2007 |

OTHER PUBLICATIONS

International Search Report of PCT/JP2007/054049, Mailing Date of Apr. 24, 2007.

* cited by examiner

*Primary Examiner*—Mike Qi
(74) *Attorney, Agent, or Firm*—Westerman, Hattori, Daniels & Adrian, LLP

(57) ABSTRACT

The liquid crystal display includes a first display unit, a second display unit, a light absorbing layer disposed on a bottom surface of the first display unit so as to absorb light which has entered the first display unit through a top surface thereof and which has been transmitted by the first liquid crystal, and a control circuit section for effecting a switch between a two-surface display mode in which the second display unit is lapped over the first display unit so as to face the bottom surface thereof with the light absorbing layer interposed between them to display images independent of each other on the first display unit and the second display unit and a high image quality mode in which the second display unit is lapped over the first display unit so as to face the top surface thereof to display the same image on the first and second display units.

20 Claims, 21 Drawing Sheets

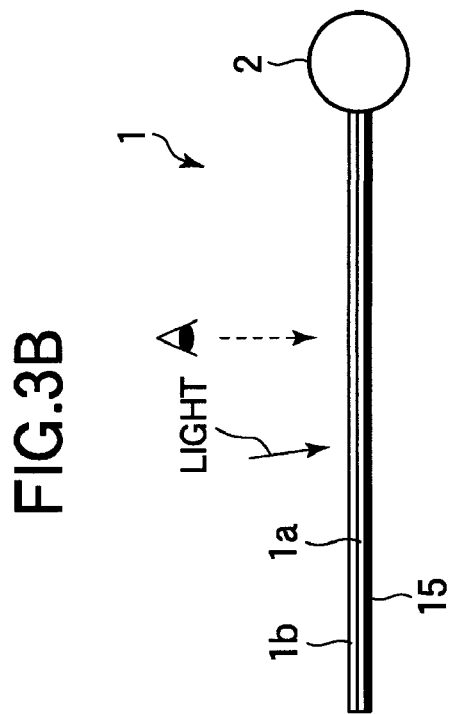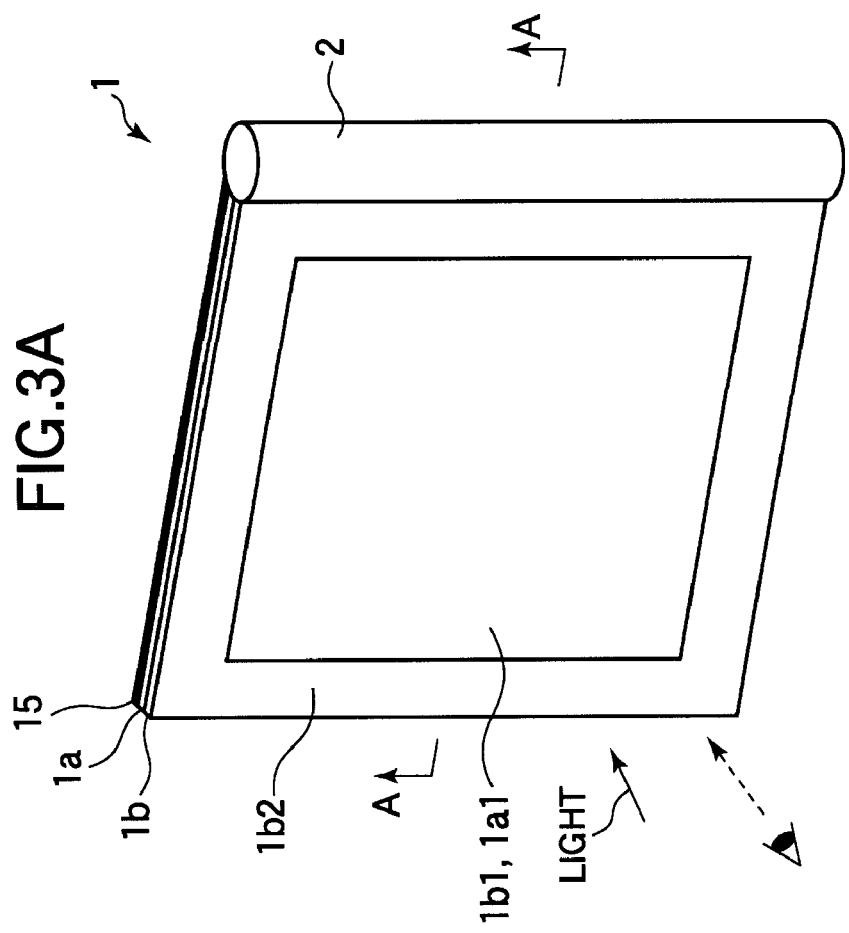

REWRITE OF TWO SURFACES

FIG.14A

| FIRST DISPLAY UNIT 1a | | | |
|---|---|---|---|
| VOLTAGES APPLIED TO ROW AND COLUMN ELECTRODES | FIRST HALF (V) | SECOND HALF (V) | DRIVING CIRCUIT |
| ON-SEG | 32 | 0 | [27] |
| OFF-SEG | 24 | 8 | |
| ON-COM | 0 | 32 | [25] |
| OFF-COM | 28 | 4 | |
| DRIVING VOLTAGE | FIRST HALF (V) | SECOND HALF (V) | PIXEL |
| SELECT ON | 32 | -32 | SELECT |
| SELECT OFF | 24 | -24 | |
| UNSELECT ON | 4 | -4 | UNSELECT |
| UNSELECT OFF | -4 | 4 | |

FIG.14B

| SECOND DISPLAY UNIT 1b | | | |
|---|---|---|---|
| VOLTAGES APPLIED TO ROW AND COLUMN ELECTRODES | FIRST HALF (V) | SECOND HALF (V) | DRIVING CIRCUIT |
| ON-SEG | 32 | 0 | [27'] |
| OFF-SEG | 24 | 8 | |
| ON-COM | 0 | 32 | [25] |
| OFF-COM | 28 | 4 | |
| DRIVING VOLTAGE | FIRST HALF (V) | SECOND HALF (V) | PIXEL |
| SELECT ON | 32 | -32 | SELECT |
| SELECT OFF | 24 | -24 | |
| UNSELECT ON | 4 | -4 | UNSELECT |
| UNSELECT OFF | -4 | 4 | |

REWRITE OF ONLY FIRST DISPLAY UNIT 1a

FIG.15A

| FIRST DISPLAY UNIT 1a | | | |
|---|---|---|---|
| VOLTAGES APPLIED TO ROW AND COLUMN ELECTRODES | FIRST HALF (V) | SECOND HALF (V) | DRIVING CIRCUIT |
| ON-SEG | 32 | 0 | [25] |
| OFF-SEG | 24 | 8 | |
| ON-COM | 0 | 32 | [27] |
| OFF-COM | 28 | 4 | |
| DRIVING VOLTAGE | FIRST HALF (V) | SECOND HALF (V) | PIXEL |
| SELECT ON | 32 | −32 | SELECT |
| SELECT OFF | 24 | −24 | |
| UNSELECT ON | 4 | −4 | UNSELECT |
| UNSELECT OFF | −4 | 4 | |

FIG.15B

| SECOND DISPLAY UNIT 1b | | | |
|---|---|---|---|
| VOLTAGES APPLIED TO ROW AND COLUMN ELECTRODES | FIRST HALF (V) | SECOND HALF (V) | DRIVING CIRCUIT |
| ON-SEG | 32 | 0 | [25] |
| OFF-SEG | 24 | 8 | |
| ON-COM (SEG MODE) | 28 | 4 | [27'] |
| OFF-COM (SEG MODE) | 28 | 4 | |
| DRIVING VOLTAGE | FIRST HALF (V) | SECOND HALF (V) | PIXEL |
| SELECT ON | 4 | −4 | SELECT |
| SELECT OFF | −4 | 4 | |
| UNSELECT ON | 4 | −4 | UNSELECT |
| UNSELECT OFF | −4 | 4 | |

REWRITE OF ONLY SECOND DISPLAY UNIT 1b

FIG.16A

| FIRST DISPLAY UNIT 1a ||||
|---|---|---|---|
| VOLTAGES APPLIED TO ROW AND COLUMN ELECTRODES | FIRST HALF (V) | SECOND HALF (V) | DRIVING CIRCUIT |
| ON-SEG | 32 | 0 | [25] |
| OFF-SEG | 24 | 8 | |
| ON-COM (SEG MODE) | 28 | 4 | [27] |
| OFF-COM (SEG MODE) | 28 | 4 | |
| DRIVING VOLTAGE | FIRST HALF (V) | SECOND HALF (V) | PIXEL |
| SELECT ON | 4 | −4 | SELECT |
| SELECT OFF | −4 | 4 | |
| UNSELECT ON | 4 | −4 | UNSELECT |
| UNSELECT OFF | −4 | 4 | |

FIG.16B

| SECOND DISPLAY UNIT 1b ||||
|---|---|---|---|
| VOLTAGES APPLIED TO ROW AND COLUMN ELECTRODES | FIRST HALF (V) | SECOND HALF (V) | DRIVING CIRCUIT |
| ON-SEG | 32 | 0 | [25] |
| OFF-SEG | 24 | 8 | |
| ON-COM | 0 | 32 | [27'] |
| OFF-COM | 28 | 4 | |
| DRIVING VOLTAGE | FIRST HALF (V) | SECOND HALF (V) | PIXEL |
| SELECT ON | 32 | −32 | SELECT |
| SELECT OFF | 24 | −24 | |
| UNSELECT ON | 4 | −4 | UNSELECT |
| UNSELECT OFF | −4 | 4 | |

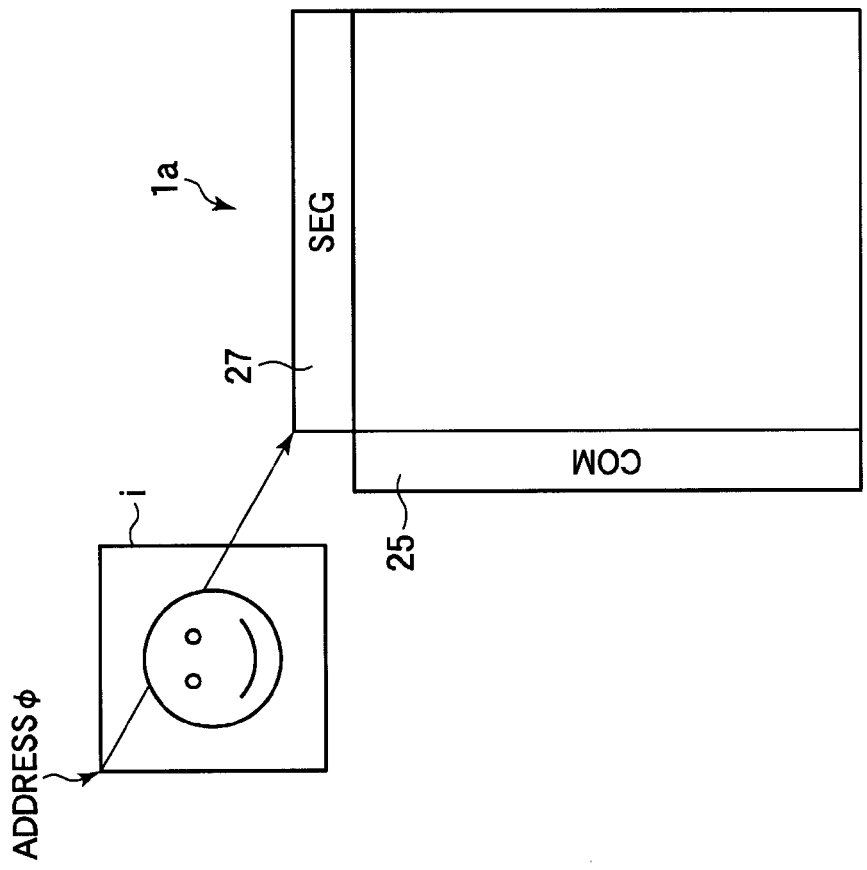
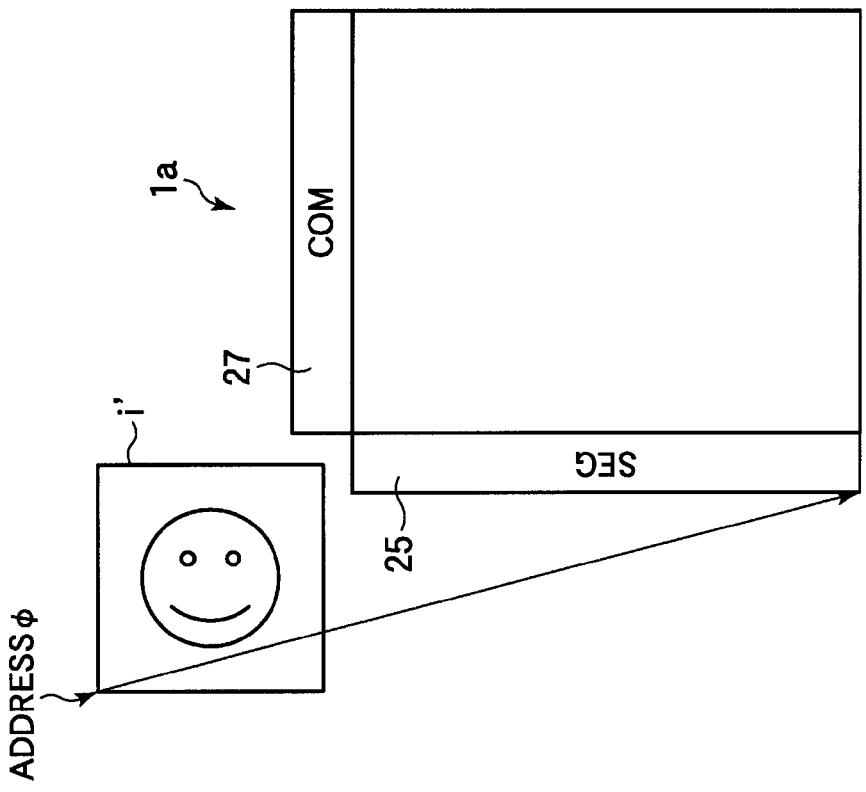

LIQUID CRYSTAL DISPLAY AND ELECTRONIC PAPER UTILIZING THE DISPLAY

This Application is a continuation of International Application No. PCT/JP2007/054049, filed Mar. 2, 2007.

FIELD

The present invention relates to a liquid crystal display in which a liquid crystal material, particularly, a liquid crystal composition exhibiting a cholesteric phase is driven to display an image and electronic paper utilizing the display.

BACKGROUND

Recently, various enterprises and universities are actively engaged in the development of electronic paper. The most promising application of electronic paper is electronic books, and other applications include the field of portable apparatus such as sub-displays of mobile terminal apparatus, and display sections of IC cards. One type of display devices used for electronic paper is liquid crystal displays utilizing a liquid crystal composition forming a cholesteric phase (such a composition is referred to as "cholesteric liquid crystal" or "chiral nematic liquid crystal", and the term "cholesteric liquid crystal" will hereinafter be used). A cholesteric liquid crystal has excellent features such as semi-permanent display retention characteristics (capability of displaying an image when no electric power is supplied; memory characteristics), vivid color display characteristics, high contrast characteristics, and high resolution characteristics.

FIG. 20 schematically shows a sectional configuration of a liquid crystal display 51 capable of full-color display utilizing cholesteric liquid crystals. The liquid crystal display 51 has a structure in which a liquid crystal display element 46b for blue (B), a liquid crystal display element 46g for green (G), and a liquid crystal display element 46r for red (R) are formed one over another in the order listed from the side of the display where a display surface is provided. In the illustration, the display surface is located on the side of a top substrate 47b, and external light (indicated by the arrow in a solid line) impinges on the display surface from above the substrate 47b. An eye of a viewer and the viewing direction of the viewer (indicated by the arrow in a broken line) are schematically shown above the substrate 47b.

The B liquid crystal display element 46b includes a blue (B) liquid crystal 43b enclosed between a pair of substrates, i.e., a top substrate 47b and a bottom substrate 49b and a pulse voltage source 41b for applying a predetermined pulse voltage to the B liquid crystal 43b. The G liquid crystal display element 46g includes a green (G) liquid crystal 43g enclosed between a pair of substrates, i.e., a top substrate 47g and a bottom substrate 49g and a pulse voltage source 41g for applying a predetermined pulse voltage to the G liquid crystal 43g. The R liquid crystal display element 46r includes a red (R) liquid crystal 43r enclosed between a pair of substrates, i.e., a top substrate 47r and a bottom substrate 49r and a pulse voltage source 41r for applying a predetermined pulse voltage to the R liquid crystal 43r. Although not shown, a plurality of electrodes are formed on an interface of the each of the top substrates 47 and bottom substrates 49 in contact with the liquid crystal 43 to apply the pulse voltage to the liquid crystal 43 from the respective pulse voltage source 41. A light absorbing layer 45 is provided on a bottom surface of the bottom substrate 49r of the R liquid crystal display element 46r.

The cholesteric liquid crystal used as each of the B, G, and R liquid crystals 43b, 43g, and 43r is a liquid crystal mixture obtaining by adding a relatively great amount of chiral additive (also referred to as "chiral material") to a nematic liquid crystal to a content of several tens percent by weight. When a nematic liquid crystal includes a relatively great amount of chiral material, a cholesteric phase, which is a great helical twist of nematic liquid crystal molecules, can be formed in the liquid crystal. For this reason, a cholesteric liquid crystal is also referred to as "chiral nematic liquid crystal".

A cholesteric liquid crystal has bi-stability (memory characteristics), and the liquid crystal can be put in any of a planar state, a focal conic state, or an intermediate state which is a mixture of the planar state and the focal conic state by adjusting the intensity of an electric field applied to the same. Once the liquid crystal enters the planar state, the focal conic state, or the mixed or intermediate state, the state is thereafter kept with stability even after the electric field is removed.

The planar state can be obtained by applying a predetermined high voltage between a top substrate 47 and a bottom substrate 49 to apply a strong electric field to the liquid crystal 43 and to thereby reset the liquid crystal 43 to the homeotropic state and thereafter nullifying the electric field abruptly. For example, the focal conic state can be obtained by applying a predetermined voltage lower than the above-described high voltage between the top substrate 47 and the bottom substrate 49 to apply an electric field to the liquid crystal 43 and thereafter nullifying the electric field abruptly.

For example, the intermediate state which is a mixture of the planar state and the focal conic state can be obtained by applying a voltage lower than the voltage to obtain the focal conic state between the top substrate 47 and the bottom substrate 49 to apply an electric field to the liquid crystal 43 and thereafter nullifying the electric field abruptly.

A display principle of the liquid crystal display 51 utilizing cholesteric liquid crystals will now be described by referring to the B liquid crystal display element 46b as an example. FIG. 21A shows alignment of liquid crystal molecules 33 of the B liquid crystal 43b of the B liquid crystal display element 46b observed when the liquid crystal is in the planar state. As shown in FIG. 21A, in the planar state, the liquid crystal molecules 33 are sequentially rotated in the thickness direction of the substrates to form helical structures, and helical axes of the helical structures are substantially perpendicular to substrate surfaces.

In the planar state, light in a predetermined wave band in accordance with the helical pitch of the liquid crystal molecules 33 is selectively reflected by the liquid crystal layer. The reflected light is circularly polarized light which is either left- or right-handed depending on the chirality of the helical pitches, and other types of light are transmitted by the liquid crystal layer. Natural light is a mixture of left- and right-handed circularly polarized light. Therefore, when natural light in the predetermined wave band impinges on the liquid crystal in the planar state, it may be assumed that 50% of the incident light is reflected with the other 50% transmitted.

A wavelength λ at which maximum reflection takes place is given by λ=n·p where n represents the average refractive index of the liquid crystal and p represents the helical pitch.

Therefore, in order to allow blue light to be selectively reflected by the B liquid crystal 43b of the B liquid crystal display element 46b in the planar state, the average refractive index n and the helical pitch p are determined, for example, such that an equation "λ=480 nm" holds true. The average refractive index n can be adjusted by selecting the liquid crystal material and the chiral material appropriately, and the helical pitch p can be adjusted by adjusting the chiral material content.

FIG. 21B shows alignment of the liquid crystal molecules 33 observed when the B liquid crystal 43b of the B liquid crystal display element 46b is in the focal conic state. As shown in FIG. 21B, in the focal conic state, the liquid crystal molecules 33 are sequentially rotated in an in-plane direction of the substrates to form helical structures, and helical axes of the helical structures are substantially parallel to the substrate surfaces. In the focal conic state, the B liquid crystal 43b loses the selectivity of wavelengths to be reflected, and most of incident light is transmitted by the layer. Since the transmitted light is absorbed by the light absorbing layer 45 disposed on the bottom surface of the bottom substrate 49r of the R liquid crystal display element 46r, a dark state (black) can be displayed.

In the intermediate state that is a mixture of the planar state and the focal conic state, the ratio between reflected light and transmitted light is adjusted according to the ratio of presence between the planar and focal conic states, and the intensity of reflected light varies accordingly. Therefore, multi-gray-level display can be performed according to intensities of reflected light.

As described above, the quantity of light reflected by the cholesteric light crystal can be controlled by a helically twisted state of alignment of liquid crystal molecules 33. Cholesteric liquid crystals selectively reflecting green and red light rays in the planar state are used as the G liquid crystal 43g and the R liquid crystal 43r, respectively just as done for the B liquid crystal 43b to fabricate the liquid crystal display 51 capable of full-color display. The liquid crystal display 51 has memory characteristics, and it is capable of performing full-color display without consuming electric power except during a screen rewrite.

Although a reflectance spectrum of a cholesteric liquid crystal has a distribution having a well-regulated shape like a normal distribution, the peak of the reflectance of the liquid crystal has an upper limit of 50% as described above. The image displaying quality of the liquid crystal display 51 is therefore still lower than that of printed matters such as paper. It is considered that display quality higher than that of printed matters can be achieved by raising the peak of reflectance into the range between 70 to 80% while maintaining such a well-regulated distribution of a reflectance spectrum. Methods proposed as approaches toward improved reflectance include the use of a six-layer structure in which an R-enantiomer and an L-enantiomer (S-enantiomer) are used in each of R, G, and B liquid crystals. However, the method is impractical because the use of a simple six-layer structure may result in an increase in manufacturing cost which overwhelms the advantage of improved image quality.

Common display elements display an image on one surface thereof with a light absorbing layer (black layer) disposed on a rearmost surface thereof, and electronic books and guide plates presently available for practical use also display an image on one surface thereof. However, when a display element is used as a substitute for a book such as an electronic book, inconvenience is encountered, for example, in that a user cannot return to the previous page quickly to reread the same. In consideration to such a situation, an electronic book allowing page-flipping has been proposed in JP-A-2000-292777, the electronic book having pages on both sides thereof constituted by display layers employing cholesteric liquid crystals. In this case, however, since images are displayed on both sides using a structure having three layers, i.e., R, G, and B layers, the electronic book encounters a limit in image quality when displaying contents which must have high image quality such as photographs.

SUMMARY

A liquid crystal display includes; a first display unit having a first liquid crystal display element including a first liquid crystal selectively reflecting light in a predetermined color in a predetermined state enclosed between substrates provided opposite to each other, a second display unit having a second liquid crystal display element including a second liquid crystal selectively reflecting light in the predetermined color in the predetermined state enclosed between substrates provided opposite to each other, a light absorbing layer disposed on a bottom surface of the first display unit so as to absorb light which has entered the first display unit through a top surface thereof and which has been transmitted by the first liquid crystal, and a control circuit section for effecting a switch between a two-surface display mode in which the second display unit is lapped over the first display unit so as to face the bottom surface thereof with the light absorbing layer interposed between them to display images independent of each other on the first display unit and the second display unit and a high image quality mode in which the second display unit is lapped over the first display unit so as to face the top surface thereof to display the same image on the first and second display units.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIGS. 3A and 3B are illustrations schematically showing the general configuration and a state of operation of the liquid crystal display 1 according to the first embodiment;

FIGS. 14A and 14B are tables showing examples of voltages applied to row and column electrodes and driving voltages applied to each pixel during an image rewrite process according to the first embodiment;

FIGS. 15A and 15B are tables showing examples of voltages applied to row and column electrodes and driving voltages applied to each pixel during an image rewrite process according to the first embodiment;

FIGS. 16A and 16B are tables showing examples of voltages applied to row and column electrodes and driving voltages applied to each pixel during an image rewrite process according to the first embodiment;

FIGS. 17A and 17B are illustrations showing steps for addressing image data when a row electrode driving circuit 25 and a data column electrode driving circuit 27 according to the first embodiment are switched to function as a data electrode driving circuit and a scan electrode driving circuit, respectively;

DETAILED DESCRIPTION OF EMBODIMENTS

First Embodiment

Figure 1B:
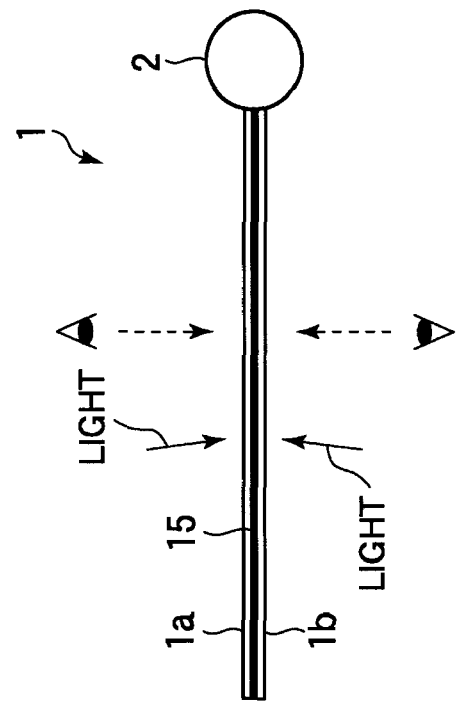
FIGS. 1A and 1B are illustrations schematically showing a general configuration and a state of operation of a liquid crystal display 1 according to a first embodiment.
Figure 1A:
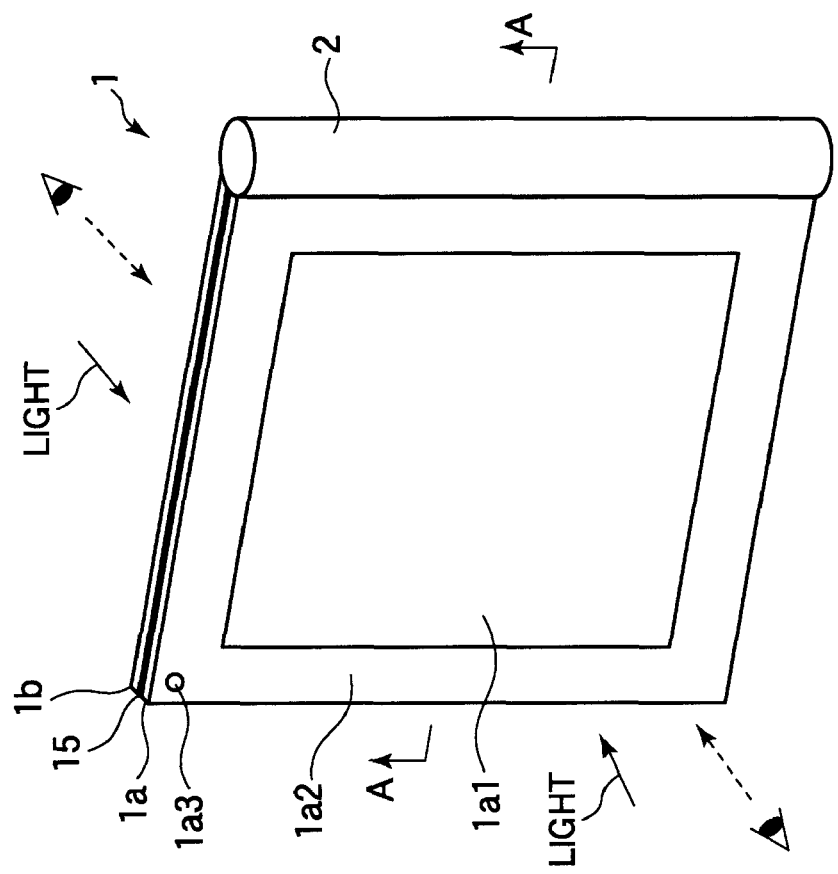
Figure 2:
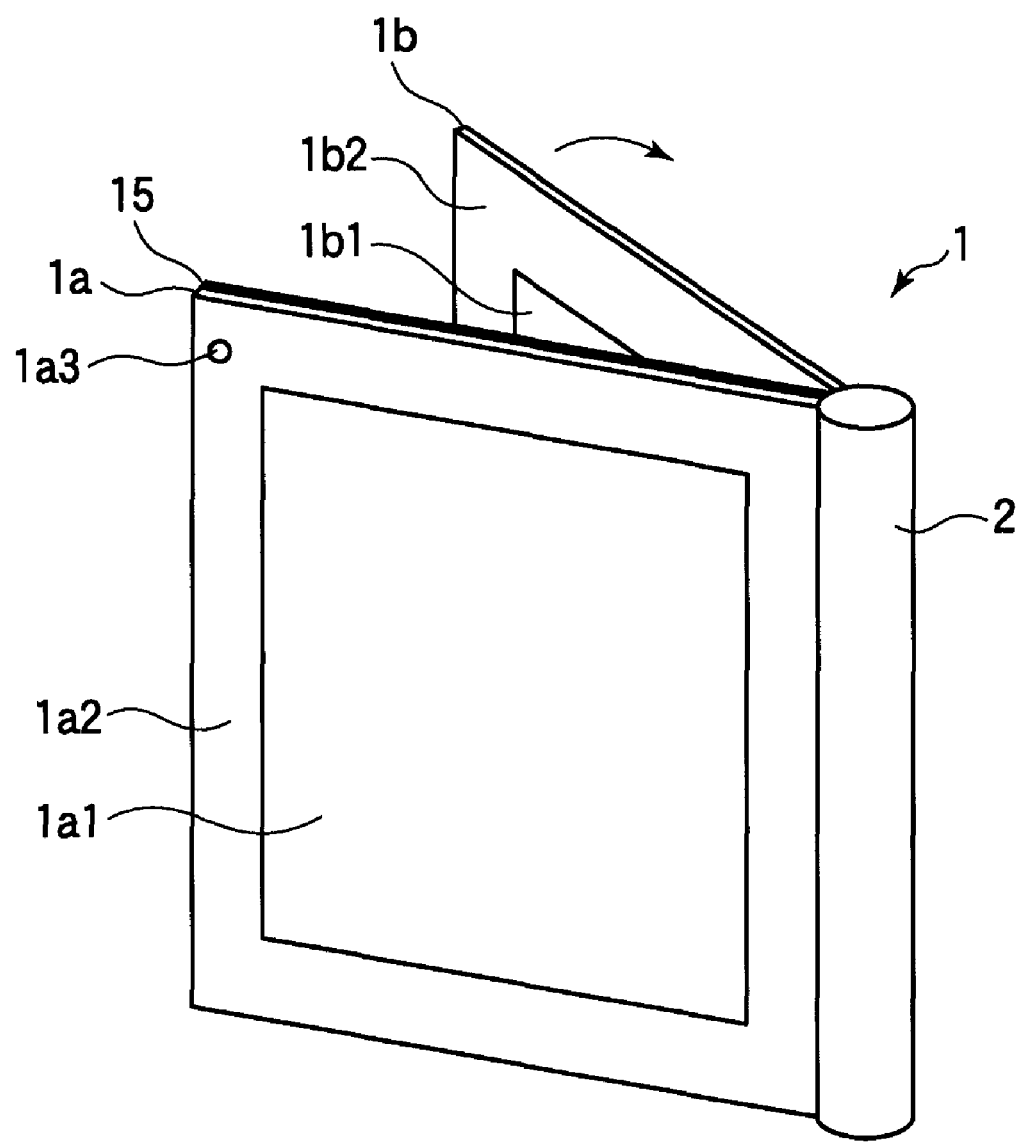
FIG. 2 is an illustration schematically showing the general configuration and a state of operation of the liquid crystal display 1 according to the first embodiment.

A liquid crystal display and electronic paper utilizing the same according to a first embodiment will now be described with reference to FIGS. 1A to 18. FIGS. 1A to 3B schematically show an overall configuration and states of operation of a liquid crystal display 1 according to the present embodiment. The liquid crystal display 1 has two display modes, i.e., a two-surface display mode and a high image quality mode which will be described later. FIGS. 1A and 1B show the liquid crystal display 1 in the two-surface display mode. FIG. 1A is a perspective view of the liquid crystal display 1, and FIG. 1B is a sectional view taken along the line A-A in FIG. 1A. FIG. 2 shows a state of the display during a switch from the two-surface display mode to the high image quality mode. FIGS. 3A and 3B show the liquid crystal display 1 in the high image quality mode. FIG. 3A is a perspective view of the liquid crystal display 1, and FIG. 3B is a sectional view taken along the line A-A in FIG. 3A.

(Outline of Configuration and Operations of the Liquid Crystal Display)

As shown in FIGS. 1A to 3B, the liquid crystal display 1 includes a first display unit 1a and a second display unit 1b. The first display unit 1a is formed like a rectangular thin plate. The first display unit 1a includes first liquid crystal display elements having first liquid crystals enclosed between substrates provided opposite to each other, the liquid crystals selectively reflecting light in predetermined colors in a predetermined state. As shown in FIG. 1A, an image display area 1a1 is defined in the middle of a surface of the first display unit 1a. A picture frame section 1a2 having light-blocking properties is formed around the image display area 1a1. A display mode select switch 1a3 having a mechanical button which goes down when subjected to a pressing force is provided in a top-left part of the picture frame section 1a2 of the first display unit 1a. The display mode select switch 1a3 is in an on-state when the button is depressed. Otherwise, the switch is in an off-state. A control circuit section 23, which is not shown in FIGS. 1A to 3B, is incorporated in the picture frame section 1a2 to switch the display mode to the two-surface display mode when the display mode select switch 1a3 is in the on-state and to the high image quality mode when the switch is in the off-state. A light absorbing layer 15 having an expanse to cover the entire image display area 1a1 is attached to a bottom surface of the first display unit 1a.

FIGS. 1A and 1B show a state of the display in which the second display unit 1b is lapped over the first display unit 1a so as to face the bottom surface thereof with the light absorbing layer 15 interposed between them. FIGS. 3A and 3B show another state of the display in which the second display unit 1b is lapped over the first display unit 1a such that an image display area 1b1 of the same faces the image display area 1a1 of the first display unit 1a. The second display unit 1b is formed to have substantially the same shape as the first display unit 1a. The second display unit 1b includes second liquid crystal display elements having second liquid crystals enclosed between substrates provided opposite to each other, the second liquid crystals selectively reflecting light in predetermined colors in a predetermined state. No light absorbing layer is attached to the second display unit 1b. Therefore, the image display area 1b1 of the second display unit 1b can be viewed from both of the top and bottom sides the unit. A picture frame section 1b2 having light blocking properties is formed around the image display area 1b1.

One edge of the first display unit 1a and one edge of the second display unit 1b associated therewith are connected to a hinge section 2 having a cylindrical shape and extending along those edges. The first display unit 1a and the second display unit 1b can be rotated substantially 360 deg relative to each other about the hinge section 2 serving as an axis of rotation. FIG. 2 illustrates a state of the display during a process of rotating the second display unit 1b from the lapped position shown in FIGS. 1A and 1B in which the unit faces the bottom surface of the first display unit 1a to the stacked position shown in FIGS. 3A and 3B in which the second display unit 1b faces the top surface of the first display unit 1a.

An image display operation of the liquid crystal display 1 having the above-described configuration will now be described with reference to FIGS. 1A to 3B. First, a display operation in the two-surface display mode will be described. A viewer views an image by rotating the first display unit 1a and the second display unit 1b relative to each other as shown in FIG. 2 about the hinge section 2 serving as an axis of rotation to set the display in the lapped position shown in FIGS. 1A and 1B in which the second display unit 1b faces the bottom surface of the first display unit 1a with the light absorbing layer 15 interposed between them.

In this state, since the button of the display mode select switch 1a3 is not depressed, the control circuit section 23, which is not shown, determines that the display is in the two-surface display mode and causes the first display unit 1a and the second display unit 1b to display images independent of each other.

The viewer can view an image i by facing the image display area 1a1 of the first display unit 1a and can view an image j different from the image i (neither of the images is shown) by turning the liquid crystal display 1 upside down to face the image display area 1b1 of the second display unit 1b.

A display operation in the high image quality mode will now be described. A viewer views an image by rotating the first display unit 1a and the second display unit 1b relative to each other as shown in FIG. 2 about the hinge section 2 serving as an axis of rotation to set the display in the lapped position shown in FIGS. 3A and 3B in which the image display area 1b1 of the second display unit 1b faces the image display area 1a1 of the first display unit 1a.

In this state, since the button of the display mode select switch 1a3 is depressed by the picture frame section 1b2 of the second display unit 1b, the control circuit section 23, which is not shown, determines that the display is in the high image quality mode and causes the first display unit 1a and the second display unit 1b to display the same image.

Thus, the viewer views an image i on the second display unit 1b by facing the image display area 1b1 of the second display unit 1b, and the viewer also faces the image display area 1a1 of the first display unit 1a located under the area 1b1 and views the same image i. Although the principle of the operation will be detailed later, high image quality comparable to quality achievable on printed matters can be achieved because the configuration for the high image quality mode provides luminance that is approximately twice the luminance achievable in the two-surface display mode.

As thus described, in the liquid crystal display 1 of the present embodiment, switching can be carried out between the display function providing high image quality comparable to quality achievable on printed matters and the two-surface display function. Therefore, the display can be used in various applications with greatly improved user friendliness.

(Configuration of First Display Unit 1a)

Figure 4:
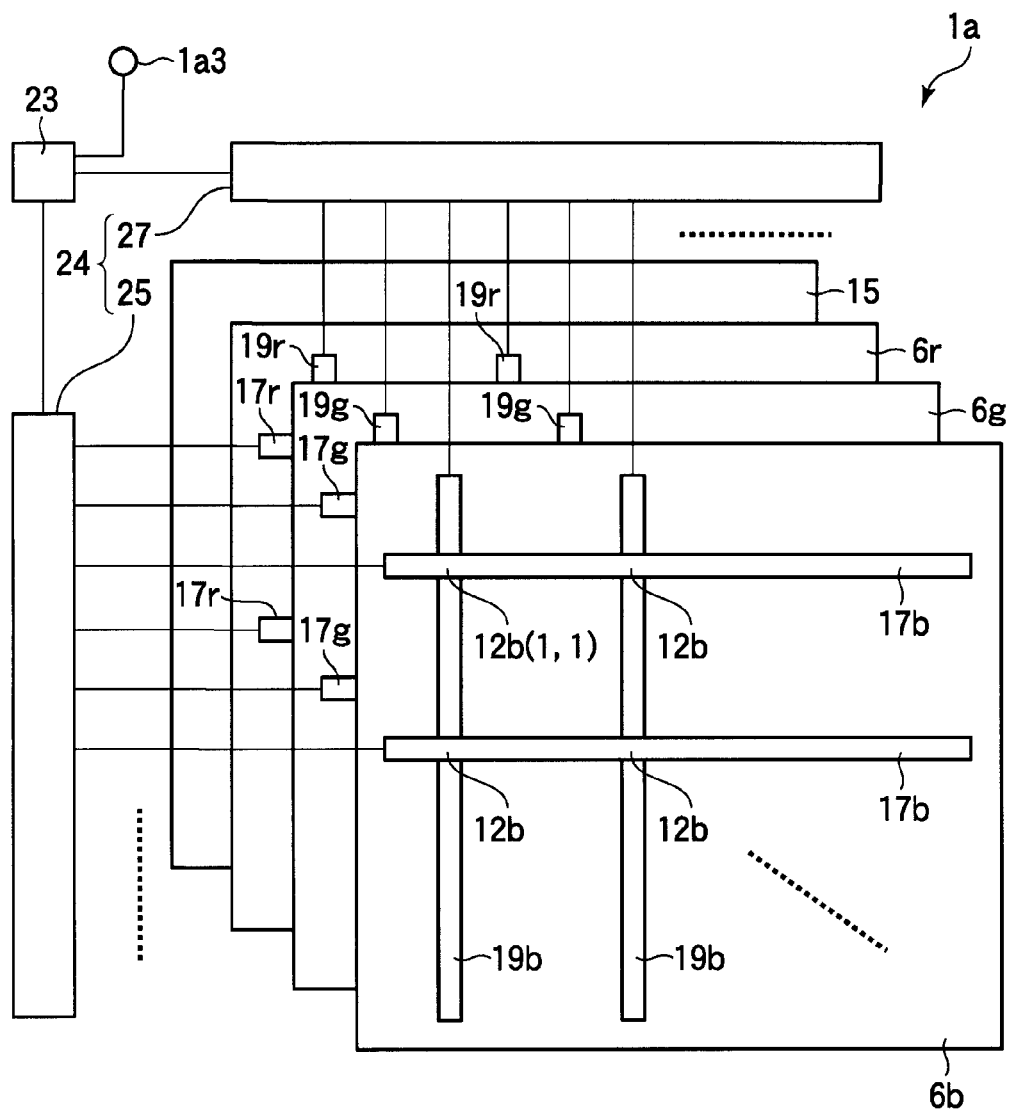
FIG. 4 is an illustration schematically showing a configuration of a first display unit 1a according to the first embodiment.
Figure 5:
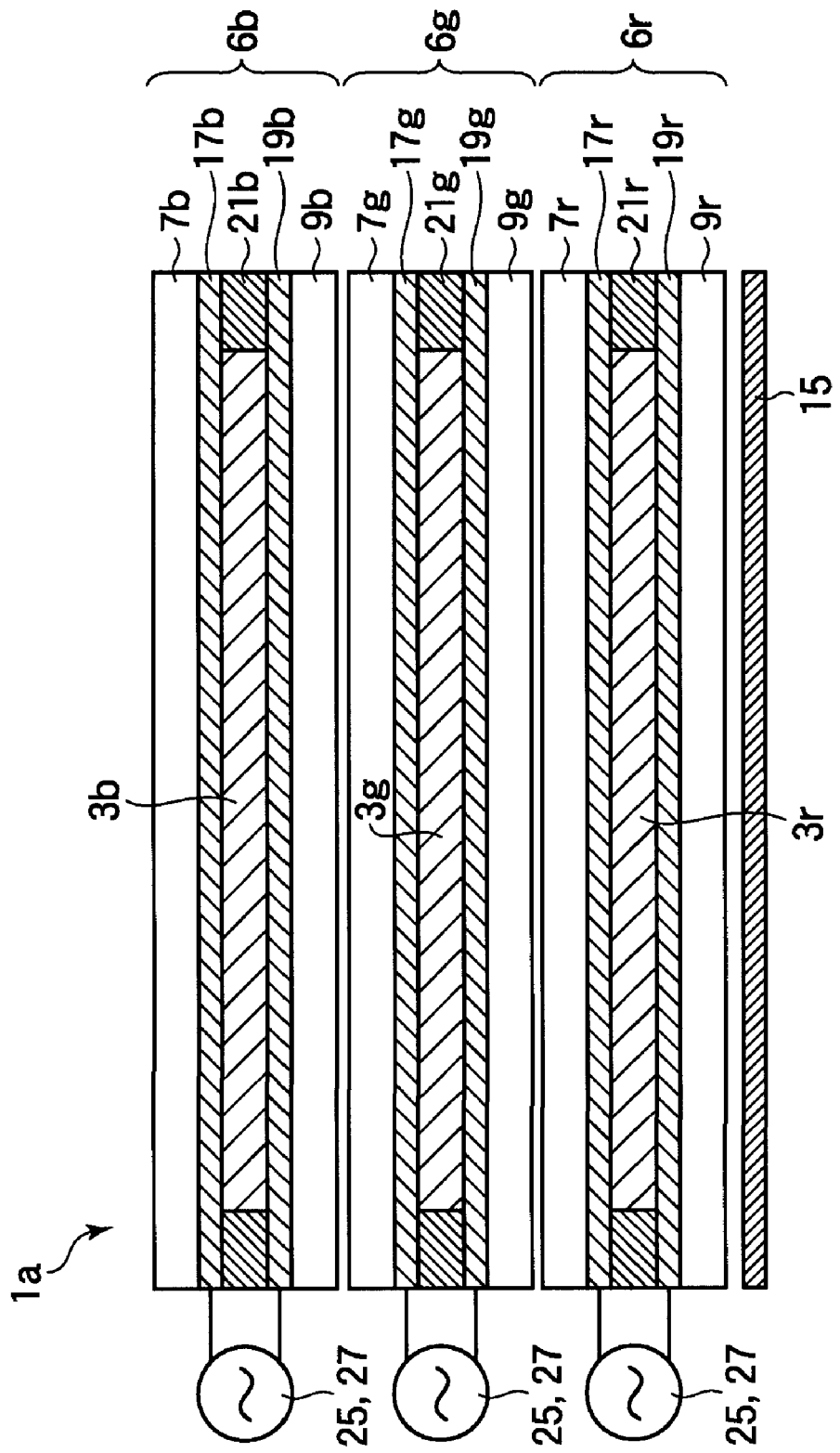
FIG. 5 is a schematic view of a sectional configuration of the first display unit 1a according to the first embodiment of the invention taken along an imaginary straight line extending in the horizontal direction of FIG. 4.

A configuration of the first display unit 1a will now be described in detail with reference to FIGS. 4 to 8. FIG. 4 schematically shows a configuration of the first display unit 1a of the present embodiment. The first display unit 1a of the present embodiment includes first liquid crystal display elements 6b, 6g, and 6r formed one over another to provide three layers for blue (B), green (G), and red (R) which enable color display. FIG. 5 is a schematic view of a sectional configuration of the first display unit 1a taken along a straight line extending in the horizontal direction of FIG. 4.

As shown in FIGS. 4 and 5, the first display unit 1a includes a first liquid crystal display element 6b selectively reflecting blue (B) light as a selected waveband in the planar state, a first liquid crystal display element 6g selectively reflecting green (G) light as a selected waveband in the planar state, and a first liquid crystal display element 6r selectively reflecting red (R) light as a selected waveband in the planar state. The first B, G, and R liquid crystal display elements 6b, 6g, and 6r are formed one over another in the order listed from a top surface side of the first display unit 1a.

The first liquid crystal display element 6b has a pair of substrates, i.e., a top substrate 7b and a bottom substrate 9b disposed opposite to each other and a first liquid crystal 3b enclosed between the substrates 7b and 9b. The first liquid crystal 3b is a cholesteric liquid crystal having an average refractive index n and a helical pitch p adjusted to reflect blue light selectively and having rightward optical rotatory power (rightward chirality). The liquid crystal forms a cholesteric phase in which blue right-handed circularly polarized light is reflected and other types of light are transmitted in the planar state and in which substantially all types of light are transmitted in the focal conic state.

The first liquid crystal display element 6g has a pair of substrates, i.e., a top substrate 7g and a bottom substrate 9g disposed opposite to each other and a first liquid crystal 3g enclosed between the substrates 7g and 9g. The first liquid crystal 3g is a cholesteric liquid crystal having an average refractive index n and a helical pitch p adjusted to reflect green light selectively and having leftward optical rotatory power (leftward chirality). The liquid crystal forms a cholesteric phase in which green left-handed circularly polarized light is reflected and other types of light are transmitted in the planar state and in which substantially all types of light are transmitted in the focal conic state.

The first liquid crystal display element 6r has a pair of substrates, i.e., a top substrate 7r and a bottom substrate 9r disposed opposite to each other and a first liquid crystal 3r enclosed between the substrates 7r and 9r. The first liquid crystal 3r is a cholesteric liquid crystal having an average refractive index n and a helical pitch p adjusted to reflect red light selectively and having rightward optical rotatory power (rightward chirality). The liquid crystal forms a cholesteric phase in which red right-handed circularly polarized light is reflected and other types of light are transmitted in the planar state and in which substantially all types of light are transmitted in the focal conic state.

The cholesteric liquid crystal constituting each of the B, G, and R first liquid crystals 3b, 3g, and 3r is obtained by adding a chiral material to a nematic liquid crystal mixture to a content of 10 to 40 percent by weight. The chiral material content is a value based on an assumption that the total amount of the nematic liquid crystal component and the chiral material constitutes 100 percent by weight. Although various types of nematic liquid crystals known in the related art may be used, the first liquid crystals 3b, 3g, and 3r preferably have dielectric constant anisotropy $\Delta\epsilon$ satisfying $20 \leq \Delta\epsilon \leq 50$ in order to keep driving voltages for the liquid crystals relatively low. When the dielectric constant anisotropy is excessively lower than the range, the driving voltages become too high. On the contrary, when the dielectric constant anisotropy is excessively higher than the range, the stability and reliability of the element is degraded, and images defects and image noises become more likely to occur. It is desirable that the liquid crystals have a specific resistance in the range from $10^{10}$ to $10^{13}$ $\Omega\cdot$cm. A voltage increase and degradation of contrast at a low temperature can be more effectively suppressed, the lower the viscosity of the liquid crystals.

The cholesteric liquid crystals preferably have refractive index anisotropy $\Delta n$ having a value satisfying $0.18 \leq \Delta n \leq 0.24$. When the refractive index anisotropy $\Delta n$ is smaller than the range, the first liquid crystals 3b, 3g, and 3r have low reflectances in the planar state. When the refractive index anisotropy is greater than the range, the first liquid crystals 3b, 3g, and 3r have significant scatter reflections in the focal conic state, and they have high viscosity which reduces the speed of response.

A chiral material that is R-enantiomorphic is added in the first B and R liquid crystals 3b and 3r, and a chiral material that is L-enantiomorphic or an optical isomer having the opposite optical rotatory power is added to the first G liquid crystal 3g. Therefore, the first B and R liquid crystals 3b and 3r have the same optical rotatory power which is different from the optical rotatory power of the first G liquid crystal 3g.

Figure 6:
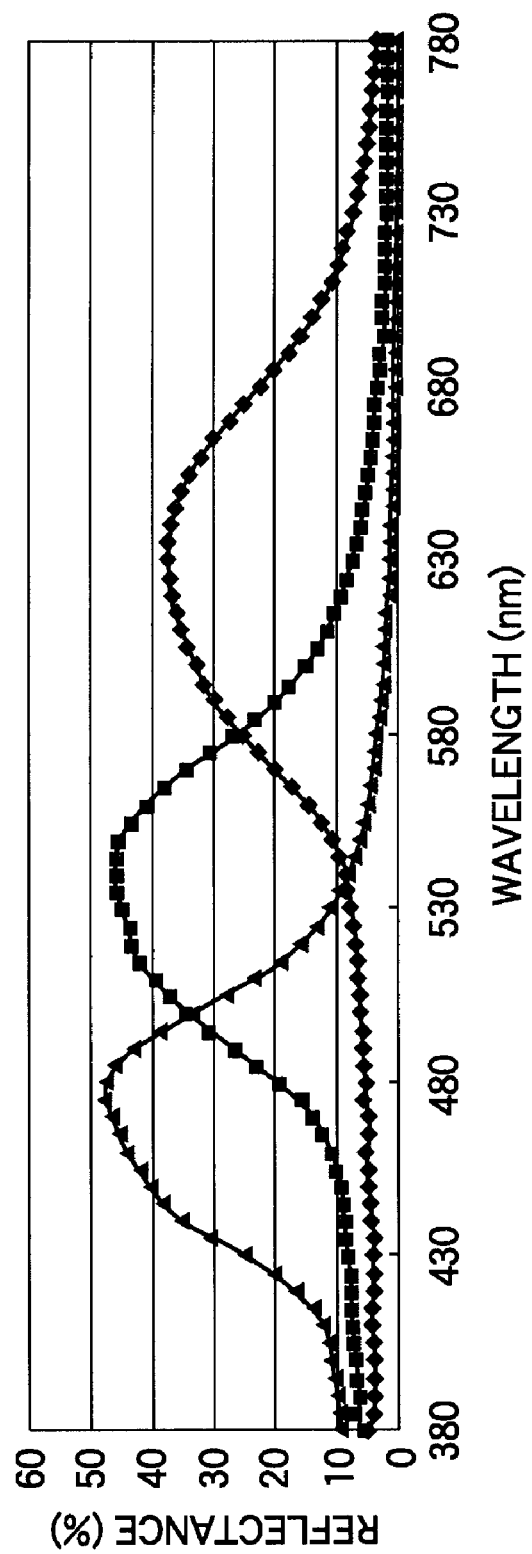
FIG. 6 is a graph showing examples of reflectance spectra observed on the first display unit 1a according to the first embodiment in a planar state.

FIG. 6 shows examples of reflectance spectra observed at the first liquid crystals 3b, 3g, and 3r in the planar state. Wavelengths (in nm) of reflected light are shown along the horizontal axis, and reflectances (in comparison to that of a white plate (in percents)) are shown along the vertical axis. The reflectance spectrum observed at the first B liquid crystal 3b is represented by the curve connecting the triangular symbols. Similarly, the reflectance spectrum observed at the first G liquid crystal 3g is represented by the curve connecting the square symbols, and the reflectance spectrum observed at the first R liquid crystal 3r is represented by the curve connecting the rhombic symbols.

As shown in FIG. 6, the center wavelengths of the reflectance spectra of the first liquid crystals 3b, 3g, and 3r in the planar state have magnitudes ascending in the order in which the first liquid crystals are listed. In the multi-layer structure formed by the first B, G, and R liquid crystal display elements 6b, 6g, and 6r, the optical rotatory power of the first G liquid crystal 3g is different from the optical rotatory power of the first B and R liquid crystals 3b and 3r in the planar state. As a result, in the regions where overlaps exist between the blue and green reflectance spectra and between the green and red reflectance spectra, for example, right-handed circularly polarized light can be reflected by the first B liquid crystal 3b and the first R liquid crystal 3r, and left-handed circularly polarized light can be reflected by the first G liquid crystal 3g. As a result, loss of reflected light can be suppressed to improve the brightness of the display screen of the first display unit 1a.

The top substrates 7b, 7g, and 7r and the bottom substrates 9b, 9g, and 9r must have translucency. In the present embodiment, pairs of polycarbonate (PC) film substrates cut in longitudinal and transverse sizes of 10 cm×8 cm are used. Glass substrates or film substrates made of polyethylene terephthalate (PET) may be used instead of PC substrates. Such film substrates have sufficient flexibility. In the present embodiment, all of the top substrates 7b, 7g, and 7r and the bottom substrates 9b, 9g, and 9r have translucency, but the bottom substrate 9r of the first liquid crystal display element 6r for displaying red disposed at the bottom of the display may be opaque.

As shown in FIGS. 4 and 5, a plurality of strip-like column electrodes 19b are formed in parallel on the side of the bottom substrate 9b of the first liquid crystal display element 6b for displaying blue facing the first B liquid crystal 3b, the electrodes extending in the vertical direction of FIG. 4. In FIG. 5, reference numeral 19b represents the region where the plurality of column electrodes 19b are provided. A plurality of strip-like row electrodes 17b are formed in parallel on the side of the top substrate 7b facing the first B liquid crystal 3b, the electrodes extending in the horizontal direction of FIG. 4.

As shown in FIG. 4, the plurality of row electrodes 17b and the plurality of column electrodes 19b are disposed face-to-face so as to intersect each other when the top substrate 7b and the bottom substrate 9b are viewed in the normal direction of the surfaces on which the electrodes are formed. In the present embodiment, transparent electrodes are patterned to form 240 row electrodes 17b and 320 column electrodes 19b in the form of stripes at a pitch of 0.24 mm to allow an image to be displayed with 240×320 dots or on a QVGA basis. Each of regions where the electrodes 17b and 19b intersect constitute a B pixel 12b. A plurality of B pixels 12b are arranged in the form of a matrix having 240 rows and 320 columns.

In the first liquid crystal display element 6g for displaying green, 240 row electrodes 17g, 320 column electrodes 19g, and G pixels 12g (not shown) arranged in the form of a matrix having 240 rows and 320 columns are formed in the same manner as in the first liquid crystal display element 6b for displaying blue. Similarly, row electrodes 17r, column electrodes 19r, and R pixels 12r (not shown) are formed in the first liquid crystal display element 6r for displaying red. Each set of B, G, and R pixels 12b, 12g, and 12r forms one pixel 12 of the first display unit 1a. The pixels 12 are arranged in the form of a matrix to form a display surface.

For example, a typical material used to form the row electrodes 17b, 17g, and 17r and the column electrodes 19b, 19g, and 19r is indium tin oxide (ITO). Transparent conductive films made of indium zinc oxide (IZO) or the like, metal electrodes made of aluminum, silicon, or the like, or transparent conductive films made of amorphous silicon or the like may alternatively be used.

A row electrode driving circuit 25 including row electrode driver ICs for driving the plurality of row electrodes 17b, 17g, and 17r is connected to the top substrates 7b, 7g, and 7r. A column electrode driving circuit 27 including column electrode driver ICs for driving the plurality of column electrodes 19b, 19g, and 19r is connected to the bottom substrates 9b, 9g, and 9r. A driving section 24 is formed by the row electrode driving circuit 25 and the column electrode driving circuit 27.

The driving section 24 is electrically connected to the control circuit section 23 to allow various control signals and data signals to be input to the driving section 24 from the control circuit section 23 and to be output in the opposite way. The display mode select switch 1a3 is also electrically connected to the control circuit section 23 to allow a switching signal to be input from the display mode select switch 1a3.

When the plurality of row electrodes 17b, 17g, and 17r serve as scan electrodes and the plurality of column electrodes 19b, 19g, and 19r serve as data electrodes, control signals are transmitted from the control circuit section 23 to the driving section 24 to cause the row electrode driving circuit 25 to function as a scan electrode driving circuit and to cause the column electrode driving circuit 27 to function as a data electrode driving circuit. The row electrode driving circuit 25 selects three predetermined row electrodes 17b, 17g, and 17r based on a predetermined signal output from the control circuit section 23 and simultaneously outputs scan signals to the three row electrodes 17b, 17g, and 17r. Based on a predetermined signal output from the control circuit section 23, the column electrode driving circuit 27 outputs image data signals for B, G, and R pixels 12b, 12g, and 12r on the selected row electrodes 17b, 17g, and 17r to the respective column electrodes 19b, 19g, and 19r. For example, general-purpose STN driver ICs are preferably used as the driver ICs for the column electrodes and the row electrodes because of they are inexpensive.

Alternatively, the plurality of row electrodes 17b, 17g, and 17r may function as data electrodes, and the plurality of column electrodes 19b, 19g, and 19r may serve as scan electrodes. In this case, predetermined control signals are transmitted from the control circuit section 23 to the driving section 24 to cause the row electrode driving circuit 25 to function as a data electrode driving circuit and to cause the column electrode driving circuit 27 to function as a scan electrode driving circuit.

When the plurality of row electrodes 17b, 17g, and 17r are made to function as scan electrodes in a situation where driving voltages for the first B, G, and R liquid crystals 3b, 3g, and 3r can be made substantially equal to each other, a predetermined output terminal of the row electrode driving circuit 25 may be commonly connected to predetermined input terminals of the row electrodes 17b, 17g, and 17r. Thus, there is no need for providing a row electrode driving circuit 25 for each of the first B, G, and R liquid crystal display elements 6b, 6g, and 6r, which allows first display unit 1a to be provided with driving circuits having a simple configuration. Further, since a reduction can be achieved in the number of scan electrode driver ICs, the first display unit 1a can be provided at a low cost.

Obviously, each of the electrodes 17b and 19b may be coated with a functional film, e.g., an insulation film or an alignment film for controlling the alignment of liquid crystal molecules (neither of the films is shown). The insulation film has the function of preventing shorting between the electrodes 17b and 19b, and the film also serves as a gas barrier layer having the function of improving the reliability of the first display unit 1a. The alignment film may be an organic film such as a polyimide resin, a polyamide-imide resin, a polyether imide resin, a polyvinyl butyral resin, or an acryl resin, and an inorganic material such as a silicon oxide or an aluminum oxide may alternatively be used. The alignment films may be also used as insulating thin films.

As shown in FIG. 5, the first B liquid crystal 3b is enclosed between the substrates 7b and 9b by a seal material 21b applied to the peripheries of the top substrate 7b and the bottom substrate 9b. The thickness (cell gap) d of the first B liquid crystal 3b must be kept uniform. In order to maintain a predetermined cell gap d, spherical spacers made of a resin or inorganic oxide are dispersed in the first B liquid crystal 3b. Alternatively, a plurality of columnar spacers are formed in the first B liquid crystal 3b. In the first display unit 1a of the present embodiment, spacers (not shown) are inserted in the first B liquid crystal 3b to keep the cell gap d uniform. More preferably, a wall structure having adhesive properties may be formed to surround pixels. Preferably, the first B liquid crystal 3b has a cell gap d in the range of 3 µm≦d≦6 µm. The first B liquid crystal 3b has an undesirably low reflectance when the cell gap d is smaller than the range and requires an excessively high driving voltage when the cell gap is greater than the range.

The structure of the first liquid crystal display element 6g for displaying green and the first liquid crystal display element 6r for displaying red will not be described because the structure is similar to that of the first liquid crystal display element 6b for displaying blue. A visible light absorbing layer 15 is provided on the outer surface (bottom surface) of the bottom substrate 9r of the first liquid crystal display element 6r for displaying red. Since the visible light absorbing layer 15 is provided, rays of light which have not been reflected by the first B, G, and R liquid crystals 3b, 3g, and 3r can be efficiently absorbed. Therefore, the first display unit 1a can display an image with a high contrast ratio.

Figure 7A:
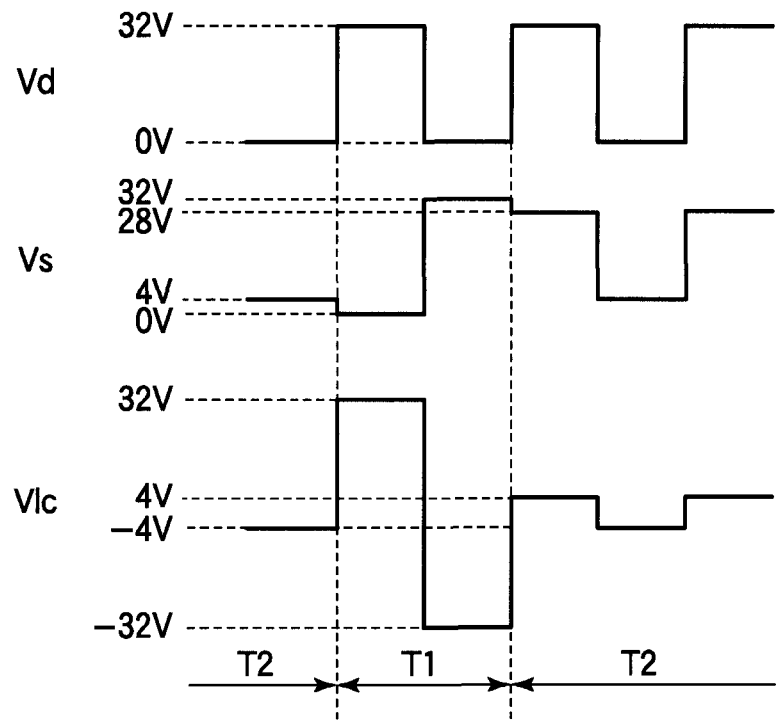
FIGS. 7A and 7B are diagrams showing a method of driving the first display unit 1a according to the first embodiment.
Figure 7B:
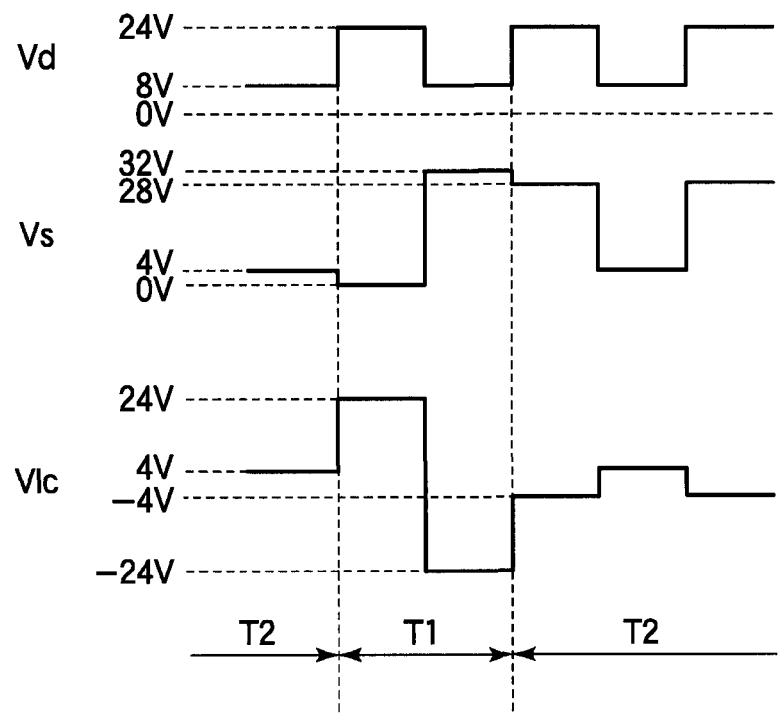

A method of driving the first display unit 1a will now be described with reference to FIGS. 7A and 7B. FIG. 7A and 7B show an example of driving waveforms of the first display unit 1a. FIG. 7A shows driving waveforms for putting a cholesteric liquid crystal in the planar state, and FIG. 7B shows driving waveforms for putting a cholesteric liquid crystal in the focal conic state. In each of FIGS. 7A and 7B, a data signal voltage waveform Vd output from the column electrode driving circuit 27 functioning as a data electrode driving circuit is shown in the top part; a scan signal voltage waveform Vs output from the row electrode driving circuit 25 functioning as a scan electrode driving circuit is shown in the middle part; and an applied voltage waveform Vlc applied to a pixel 12b of the first B liquid crystal 3b is shown in the bottom part. In FIGS. 7A and 7B, time is shown to lapse in the left-to-right direction of the figures, and voltages are represented in the vertical direction of the figures.

Figure 8:
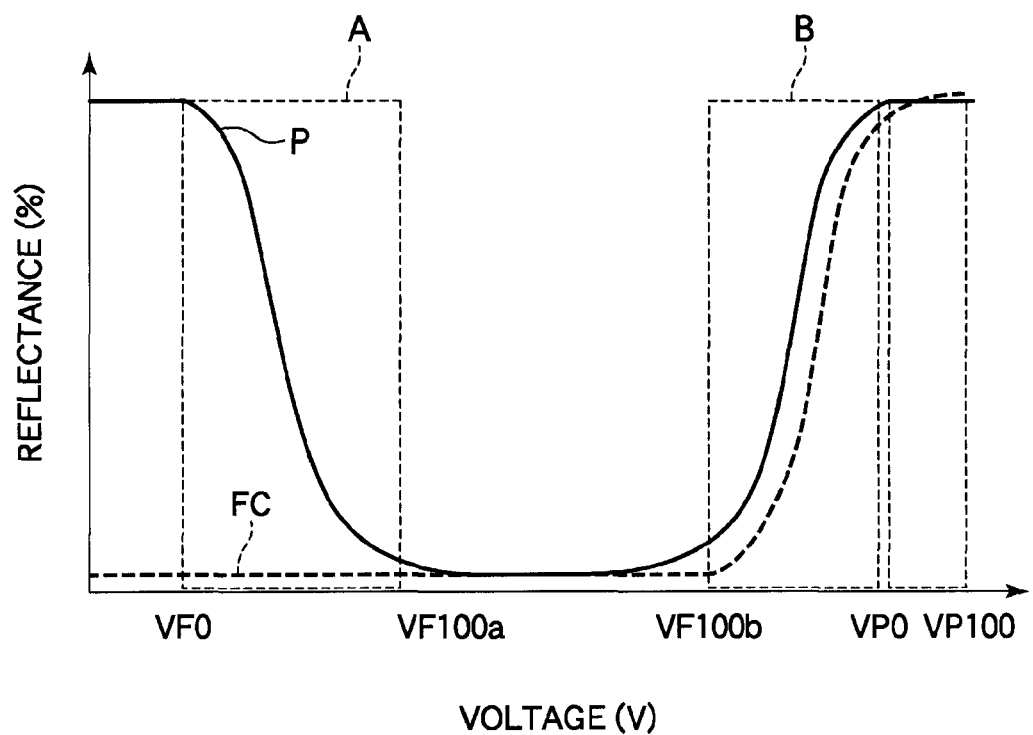
FIG. 8 is a graph showing an example of voltage-reflectance characteristics of a cholesteric liquid crystal.

FIG. 8 shows an example of voltage-reflectance characteristics of a cholesteric liquid crystal. Voltage values (V) applied to the cholesteric liquid crystal are shown along the horizontal axis, and reflectances (%) of the cholesteric liquid crystal are shown along the vertical axis. The curve P in a solid line shown in FIG. 8 represents voltage-reflectance characteristics observed when the cholesteric liquid crystal is initially in the planar state, and the curve FC in a broken line represents voltage-reflectance characteristics observed when the cholesteric liquid crystal is initially in the focal conic state.

An example will now be described, in which a predetermined voltage is applied to a blue (B) pixel 12b (1,1) that is located at the intersection between the column electrode 19b of the first column of the first liquid crystal display element 6b for displaying blue shown in FIG. 4 and the row electrode 17b of the first row. As shown in FIG. 7A, in the first half of a selection period T1 during which the row electrode 17b in the first row is selected, the data signal voltage Vd is at a high luminance data voltage value (+32 V), whereas the scan signal voltage Vs is 0 V. In the second half of the period, the data signal voltage Vd is at a high luminance data voltage value (0 V), whereas the scan signal voltage Vs is +32 V. Therefore, a pulse voltage of ±32 V is applied to the first B liquid crystal 3b at the B pixel 12b (1,1) during the selection period T1. When a predetermined high voltage VP100 (e.g., 32 V) is applied to the cholesteric liquid crystal as shown in FIG. 8 to generate a strong electric field therein, the helical structure of liquid crystal molecules is completely decomposed into a homeotropic state in which all liquid crystal molecules follow the direction of the electric field. Therefore, the liquid crystal molecules of the first B liquid crystal 3b at the B pixel 12b(1,1) are in the homeotropic state during the selection period T1.

When the selection period T1 ends and a non-selection period T2 starts, voltages of, for example, +28 V and +4 V having a period equivalent to one half of the selection period T1 are applied to the row electrode 17b of the first row. On the other hand, predetermined data signal voltages Vd are applied to the column electrode 19b of the first column. In FIG. 7A, voltages of, for example, +32 V and 0 V having a period equivalent to one half of the selection period T1 are applied to the column electrode 19b of the first column in the non-election period T2 following the selection period T1. Therefore, a pulse voltage VF0 of ±4 V is applied to the first B liquid crystal 3b at the B pixel 12b(1,1) during the non-selection period T2. As a result, the electric field generated in the first B liquid crystal 3b at the B pixel 12b(1,1) during the non-selection period T2 is made substantially zero.

When the voltage applied to the liquid crystal changes from the voltage VP100 (±32 V) to the voltage VF0 (±4 V) to make the electric field substantially zero abruptly while the liquid crystal molecules are in the homeotropic state, the liquid crystal molecules enter a helical state in which the helical axes are directed substantially perpendicular to the electrodes 17b and 19b. Thus, the liquid crystal enters the planar state, in which rays of light in accordance with the helical pitch are selectively reflected. Since the first B liquid crystal 3b at the B pixel 12b(1,1) thus enters the planar state to reflect light, blue is displayed at the B pixel 12b(1,1).

Let us assume that the data signal voltage Vd is at low luminance data voltage values of 24V and 8 V in the first and second halves of the selection period T1, respectively, whereas the scan signal voltage Vs is 0 V and +32 V in the same respective periods, as shown in FIG. 7B. Then, a pulse voltage of ±24 V is applied to the first B liquid crystal 3b at the B pixel 12b(1,1). When a predetermined low voltage VF100b (e.g., 24 V) is applied to the cholesteric liquid crystal as shown in FIG. 8 to generate a weak electric field therein, the helical structure of the liquid crystal molecules is not completely decomposed. In the non-selection period T2, for example, voltages of +28 V and +4 V having a period equivalent to one half of the selection period T1 are applied to the row electrode 17b of the first row, and predetermined data signal voltages Vd (e.g., +24 V and 8 V) having a period equivalent to one half of the selection period T1 are applied to the column electrode 19b. Thus, a pulse voltage of ±4 V is applied to the first B liquid crystal 3b at the B pixel 12b(1,1) during the non-selection period T2. As a result, the electric field generated in the first B liquid crystal 3b at the B pixel 12b(1,1) is made substantially zero during the non-selection period T2.

When the voltage applied to the cholesteric liquid crystal changes from the voltage VF100b (±24 V) to the voltage VF0 (±4 V) to make the electric field substantially zero abruptly in the state in which the helical structure of the liquid crystal molecules is not completely decomposed, the liquid crystal molecules enter a helical state in which the helical axes are directed substantially parallel to the electrodes 17b and 19b. That is, the liquid crystal molecules enter the focal conic state in which incident light is transmitted. Thus, the first B liquid crystal 3b at the B pixel 12b(1,1) enters the focal conic state to transmit light. As shown in FIG. 8, the cholesteric liquid crystal can be also put in the focal conic state by applying the voltage VP100 (V) to generate a strong electric field in the liquid crystal and by thereafter removing the electric field slowly.

The driving voltages and driving method described above are merely examples. When a pulse voltage of 30 to 35 V is applied between the electrodes for an effective duration of 20 ms at room temperature, the cholesteric liquid crystal of the first B liquid crystal layer enters a state for selective reflection (planar state). When a pulse voltage of 15 to 22 V is applied for an effective duration of 20 ms, the cholesteric liquid crystal enters a highly transmissive state (focal conic state).

A green (G) pixel 12g(1,1) and a red (R) pixel 12r(1,1) are driven in the same manner in which the B pixel 12b(1,1) is driven, whereby color display can be performed at a pixel 12(1,1) that is formed by stacking the three pixels, i.e., the B, G, and R pixels 12b(1,1), 12g(1,1), and 12r(1,1) one over another. The scan electrodes constituting the first to m-th rows may be driven in the so-called line sequential mode to rewrite the data voltages at the data electrodes on a row-by-row basis, whereby display data can be output to all of pixels 12(1,1) to 12(m, n) to achieve color display of one frame (display screen).

The intermediate state that is a mixture of the planar state and the focal conic state can be obtained to enable full color display by applying a voltage within the two ranges A and B shown in FIG. 8 to apply an electric field having an intermediate intensity to the cholesteric liquid crystal and removing the electric field abruptly.

A method of manufacturing the first display unit 1a of the present embodiment will now be specifically described.

ITO transparent electrodes are formed using a sputtering process on two PC film substrates 7 and 9 which have been cut to have longitudinal and transversal lengths of, for example, 10 cm and 8 cm. The ITO electrodes are then patterned at a photolithographic step to form electrodes in the form of stripes having a pitch of 0.24 mm (row electrodes 17 and column electrodes 19) on the respective substrates. Thus, stripe-like electrodes are formed on the two PC film substrates, respectively, to allow QVGA display of 240×320 dots.

Then, an epoxy type seal material 21 is applied to a peripheral part of either of the PC film substrates using a dispenser. Next, spacers 4 μm in average grain size (manufactured by SEKISUI FINE CHEMICAL) are dispersed on the other PC film substrate i.e., the substrate 9 or 7. Then, the two PC film substrates 7 and 9 are combined and heated for one hour at 160° C. to cure the seal material 21. Then, a first B cholesteric liquid crystal 3b is injected using a vacuum injection process, and the injection port is thereafter sealed with an epoxy type sealing material to fabricate a first liquid crystal display element 6b for displaying blue. First liquid crystal display elements 6g and 6r for displaying green and red are fabricated using the same method.

Next, the first liquid crystal display elements 6b, 6g, and 6r for displaying blue, green, and red are formed one over another in the order listed from the side of a display surface. Then, a light absorbing layer 15 absorbing visible light is disposed on a bottom surface of a bottom substrate 9r of the first liquid crystal display element 6r for displaying red. General purpose STN driver ICs in a TCP structure are then crimped to terminal parts of the row electrodes 17 and column electrodes 19 of the first liquid crystal display elements 6b, 6g, and 6r for displaying blue, green, and red formed one over another, and a power supply circuit and a control circuit section 23 are further connected. Thus, a first display unit 1a capable of QVGA display is completed.

(Configuration of Second Display Unit 1b)

Figure 9:
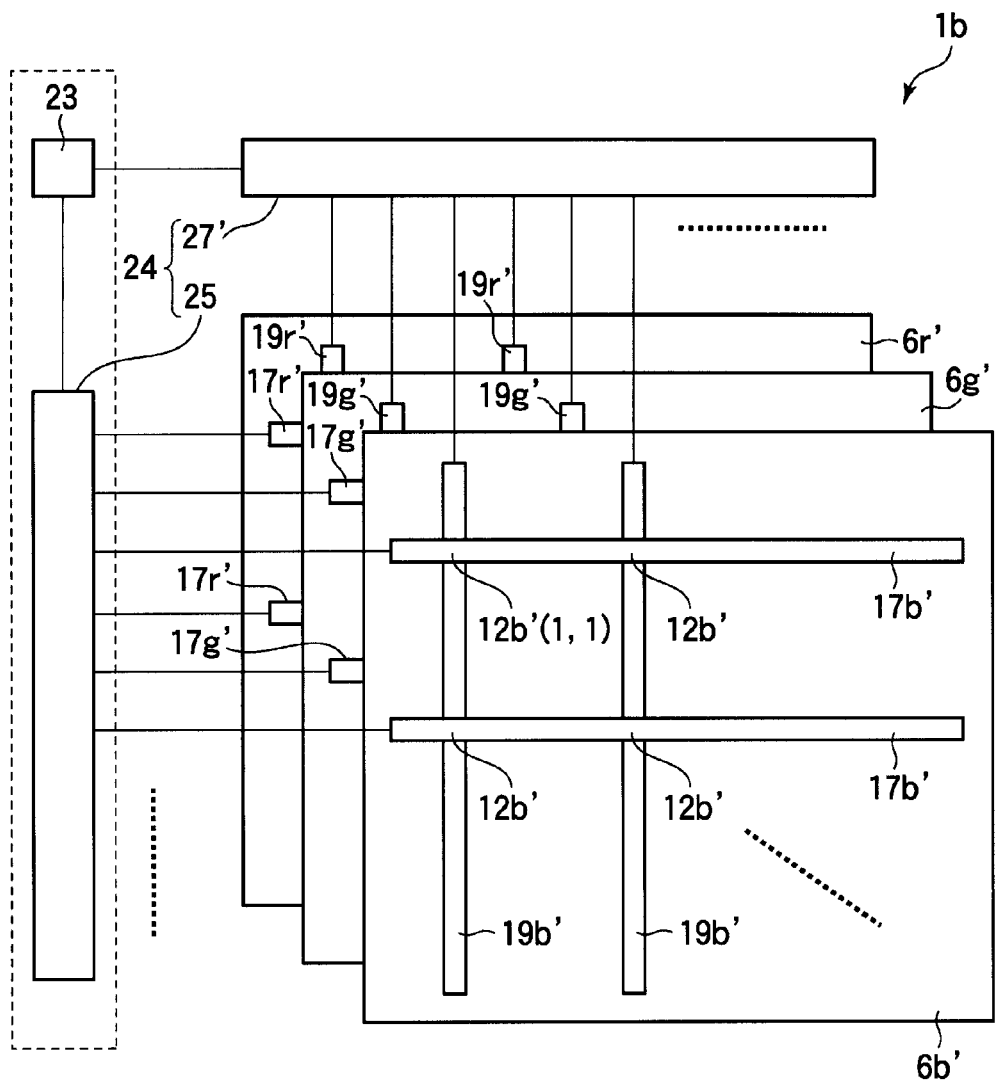
FIG. 9 is an illustration schematically showing a configuration of a second display unit 1b according to the first embodiment.
Figure 10:
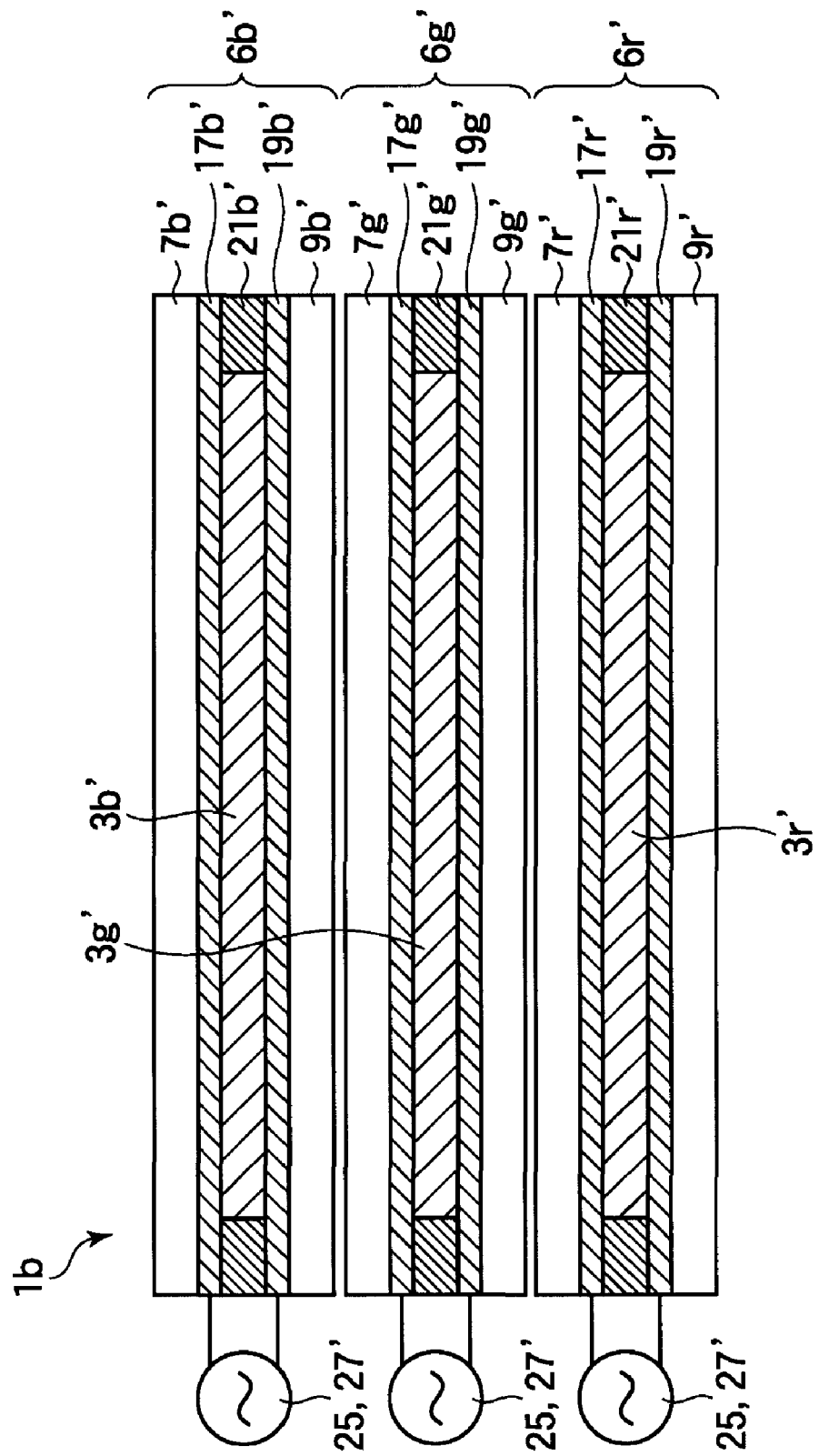
FIG. 10 is a schematic view of a sectional configuration of the second display unit 1b according to the first embodiment taken along an imaginary straight line extending in the horizontal direction of FIG. 9.

A configuration of the second display unit 1b will now be described in detail with reference to FIGS. 9 and 10. FIG. 9 schematically shows a configuration of the second display unit 1b. FIG. 10 is a schematic view of a sectional configuration of the second display unit 1b taken along a straight line extending in the horizontal direction of FIG. 9. The second display unit 1b of the present embodiment includes second liquid crystal display elements 6b', 6g', and 6r' formed one over another to provide three layers for blue (B), green (G), and red (R) which enable color display. That is, the second display unit 1b has a plurality of second liquid crystal display elements 6b', 6g', and 6r' formed one over another, the number of the display elements being the same as the number of the first liquid crystal display elements 6b, 6g, and 6r of the first display unit 1a.

As shown in FIGS. 9 and 10, the second display unit 1b includes a second liquid crystal display element 6b' selectively reflecting blue (B) light as a selected waveband in the planar state, a second liquid crystal display element 6g' selectively reflecting green (G) light as a selected waveband in the planar state, and a second liquid crystal display element 6r' selectively reflecting red (R) light as a selected waveband in the planar state. The second B, G, and R liquid crystal display elements 6b', 6g', and 6r' are formed one over another in the order listed from a top surface side of the second display unit 1b.

The second liquid crystal display element 6b' has a pair of substrates, i.e., a top substrate 7b' and a bottom substrate 9b' disposed opposite to each other and a second liquid crystal 3b' enclosed between the substrates 7b' and 9b'. The second liquid crystal 3b' is a liquid crystal having an average refractive index n and a helical pitch p adjusted to reflect blue light selectively and having leftward optical rotatory power. The liquid crystal forms a cholesteric phase in which blue left-handed circularly polarized light is reflected and other types of light are transmitted in the planar state and in which substantially all types of light are transmitted in the focal conic state. That is, the optical rotatory power of the second liquid crystal 3b' of the second display unit 1b is different from the optical rotatory power of the first liquid crystal 3b of the first display unit 1a.

The second liquid crystal display element 6g' has a pair of substrates, i.e., a top substrate 7g' and a bottom substrate 9g' disposed opposite to each other and a second liquid crystal 3g' enclosed between the substrates 7g' and 9g'. The second liquid crystal 3g' is a liquid crystal having an average refractive index n and a helical pitch p adjusted to reflect green light selectively and having rightward optical rotatory power. The liquid crystal forms a cholesteric phase in which green right-handed circularly polarized light is reflected and other types of light are transmitted in the planar state and in which substantially all types of light are transmitted in the focal conic state. That is, the optical rotatory power of the second liquid crystal 3g' of the second display unit 1b is different from the optical rotatory power of the first liquid crystal 3g of the first display unit 1a.

The second liquid crystal display element 6r' has a pair of substrates, i.e., a top substrate 7r' and a bottom substrate 9r' disposed opposite to each other and a second liquid crystal 3r' enclosed between the substrates 7r' and 9r'. The second liquid crystal 3r' is a liquid crystal having an average refractive index n and a helical pitch p adjusted to reflect red light selectively and having leftward optical rotatory power. The liquid crystal forms a cholesteric phase in which red left-handed circularly polarized light is reflected and other types of light are transmitted in the planar state and in which substantially all types of light are transmitted in the focal conic state. That is, the optical rotatory power of the second liquid crystal 3r' of the second display unit 1b is different from the optical rotatory power of the first liquid crystal 3r of the first display unit 1a.

A chiral material that is L-enantiomorphic is added in the second B and R liquid crystals 3b' and 3r', and a chiral material that is R-enantiomorphic is added to the second G liquid crystal 3g'. Therefore, the second B and R liquid crystals 3b' and 3r' have the same optical rotatory power which is different from the optical rotatory power of the second G liquid crystal 3g'. The first and second B liquid crystals 3b and 3b' are different from each other in optical rotatory power. The first and second G liquid crystals 3g and 3g' are different from each other in optical rotatory power. The first and second R liquid crystals 3r and 3r' are different from each other in optical rotatory power. The description of other aspects of the second liquid crystals 3b', 3g', and 3r' is omitted because they are similar to the cholesteric liquid crystal materials constituting the first liquid crystals 3b, 3g, and 3r except the above-described points.

Referring to reflectance spectra in the planar state shown in FIG. 6, since the first liquid crystals 3b, 3g, and 3r is different from the respective second liquid crystals 3b', 3g', and 3r' in optical rotatory power, right-handed circularly polarized light can be reflected by the first B liquid crystal 3b and left-handed circularly polarized light can be reflected by the second B liquid crystal 3b' in the region of the reflectance spectrum of blue shown in FIG. 6. In the region of the reflectance spectrum of green, left-handed circularly polarized light can be reflected by the first G liquid crystal 3b, and right-handed circularly polarized light can be reflected by the second G liquid crystal 3g'. Further, in the region of the reflectance spectrum of red, right-handed circularly polarized light can be reflected by the first R liquid crystal 3r, and left-handed circularly polarized light can be reflected by the second R liquid crystal 3r'. As a result, in the high image quality mode in which the second display unit 1b is lapped over a top surface of the first display unit 1a, loss of reflected light can be reduced, and the display surface can be provided with improved brightness that is approximately twice the brightness of display according to the related art.

The specific configurations of the top substrates 7b', 7g', and 7r' and the bottom substrates 9b', 9g', and 9r' will not be described because they are similar to the configurations of the top substrates 7b, 7g, and 7r and the bottom substrates 9b, 9g, and 9r. The disposition and material of the row electrodes 17b', 17g', and 17r' and the column electrodes 19b', 19g', and 19r' will not be described because they are similarly to the disposition and material of the row electrodes 17b, 17g, and 17r and the column electrodes 19b, 19g, and 19r.

The row electrodes 17b', 17g', and 17r' of the second liquid crystal display elements 6b', 6g', and 6r' of the present embodiment are connected to the row electrode driving circuit 25 for driving the row electrodes 17b, 17g, and 17r of the first liquid crystal display elements 6b, 6g, and 6r to share the circuit. Thus, there is no need for providing a row electrode driving circuit 25' carrying row electrode driver ICs for driving the plurality of row electrodes 17b', 17g', and 17r' on the top substrates 7b', 7g', and 7r', and a reduction in manufacturing cost can therefore be achieved. Instead, flexible printed circuit (FPC) boards (not shown) are disposed on the top substrates 7b', 7g', and 7r', the PFCs having a plurality of wirings formed thereon for connecting the plurality of row electrodes 17b', 17g', and 17r' to the row electrode driving circuit 25.

A column electrode driving circuit 27' carrying column electrode driver ICs for driving the plurality of column electrodes 19b', 19g', and 19r' is connected to the bottom substrates 9b', 9g', and 9r'. The following description is on an assumption that the driving section 24 includes the row electrode driving circuit 25, the column electrode driving circuit 27, and the column electrode driving circuit 27'.

The configuration and operations of the column electrode driving circuit 27' will not be described because they are similar to the configuration and operations of the column electrode driving circuit 27. Functional films provided on the electrodes 17' and 19', a seal material 21' applied to the peripheries of the top substrate 7' and the bottom substrate 9', and a cell gap d of the second liquid crystals 3' will not be described because the description of the first display unit 1a equally applies. The description will omit the method of driving the second display unit 1b alone because it is the same as the method for the first display unit 1a described above with reference to FIGS. 7A, 7B, and 8.

A pixel 12'(1,1) of the second display unit 1b formed by three pixels, i.e., B, G, and R pixels 12b'(1,1), 12g'(1,1), and 12r'(1,1) stacked one over another can be enabled for color display according to the driving method described above with reference to FIGS. 7A, 7B, and 8. Scan electrodes constituting the first to m-th rows can be driven in the so-called line sequential mode to rewrite data voltages at data electrodes on a row-by-row basis, whereby display data can be output to all of pixels 12'(1,1) to 12'(m, n) to achieve color display of one frame (display screen).

The method of manufacturing the second display unit 1b of the present embodiment will not be described because it is similar to the method of manufacturing the first display unit 1a except that the row electrode driving circuit 25 is manufactured to allow use on a shared basis.

(Configuration and Operations of Liquid Crystal Display 1)

The hinge section 2 rotatably holding the first and second display units 1a and 1b at one edge of each unit has a rotating mechanism and incorporates power supply portions (not shown) for supplying power to electrical and electronic circuit portions provided in the first and second display units 1a and 1b. The flexible printed circuit (FPC) boards (not shown) extending from the top substrates 7b', 7g', and 7r' for connecting the plurality of row electrodes 17b', 17g', and 17r' to the row electrode driving circuit 25 are connected to the row electrode driving circuit 25 in the first display unit 1a through the hinge section 2. The structure allows power to be supplied to the electrical and electronic circuit portions provided in the first and second display units 1a and 1b even when the first and second display units 1a and 1b are rotated relative to each other about the hinge section 2 serving as an axis of rotation. The structure also allows signals to be output from the row electrode driving circuit 25 to the plurality of row electrodes 17b', 17g', and 17r'.

Figure 11:
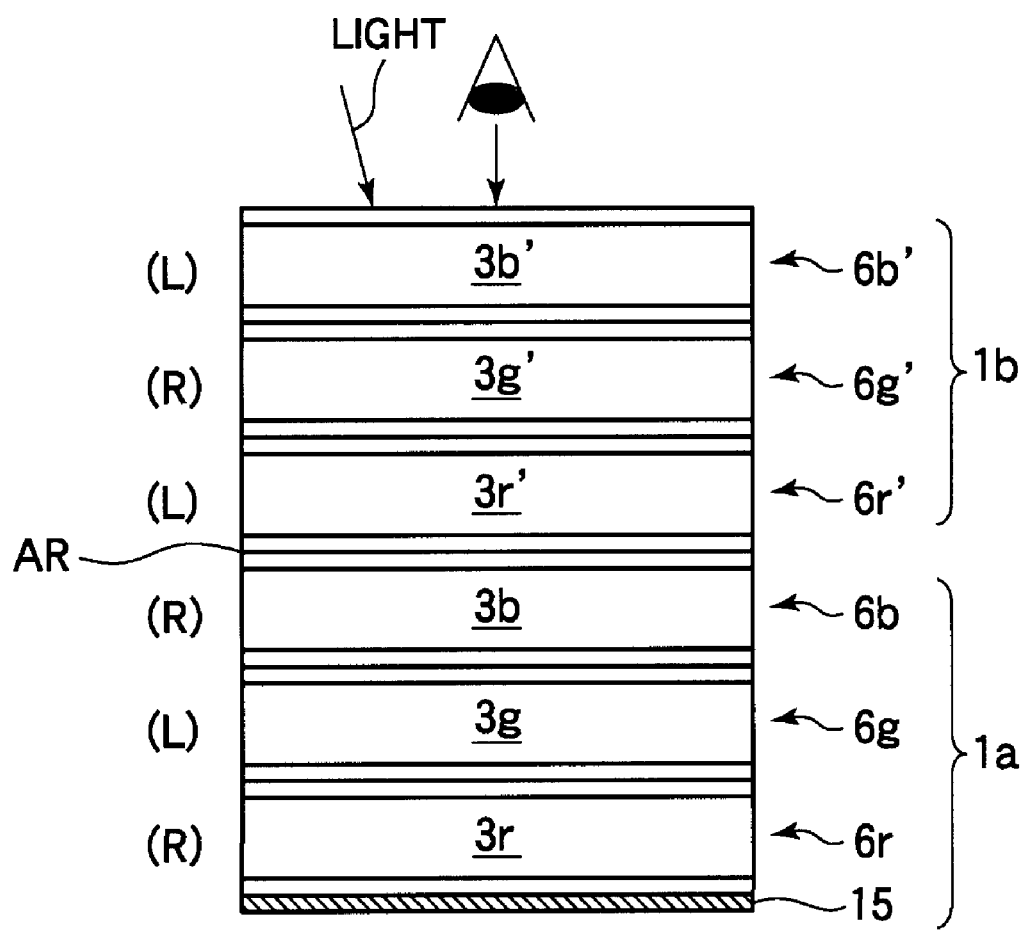
FIG. 11 is a schematic view of a section of the liquid crystal display 1 according to the first embodiment taken when displaying an image in a high image quality mode.

FIG. 11 is a schematic view of a section of the liquid crystal display 1 taken when it displays an image in the high image quality mode. When the liquid crystal display 1 of the present embodiment is in the high image quality mode, the first display unit 1a is located above the light absorbing layer 15 that is at the bottom of the display, and the second display unit 1b is located above the unit 1a. More specifically, the first liquid crystal display elements 6r, 6g, and 6b are stacked in the order listed on the light absorbing layer 15, and the second liquid crystal display elements 6r', 6g', and 6b' are stacked in the order listed on the first liquid display crystal element 3b. Thus, six layers are stacked in total. In order to suppress reflections at an interface between the first display unit 1a and the second display unit 1b, an anti-reflection film AR constituted by a dielectric multi-layer film or the like may obviously be formed on a surface of at least either the first liquid crystal display element 6b or the second liquid crystal display element 6r'.

In the high image quality mode, the second liquid crystal display element 6r' having the second liquid crystal 3r' that is L-enantiomorphic is stacked above the first liquid crystal display element 6r having the first liquid crystal 3r that is R-enantiomorphic to display red. Similarly, the second liquid crystal display element 6g' having the second liquid crystal 3g' that is R-enantiomorphic is stacked above the first liquid crystal display element 6g having the first liquid crystal 3g that is L-enantiomorphic to display green. The second liquid crystal display element 6b' having the second liquid crystal 3b' that is L-enantiomorphic is stacked on the first liquid crystal display element 6b having the first liquid crystal 3b that is R-enantiomorphic to display blue.

Since such an arrangement allows the peak of reflectance of each color to be improved by about 70 to 80%, a color can be vividly displayed with very high brightness, and high image quality comparable to display quality on printed matters can therefore be achieved.

Figure 12:
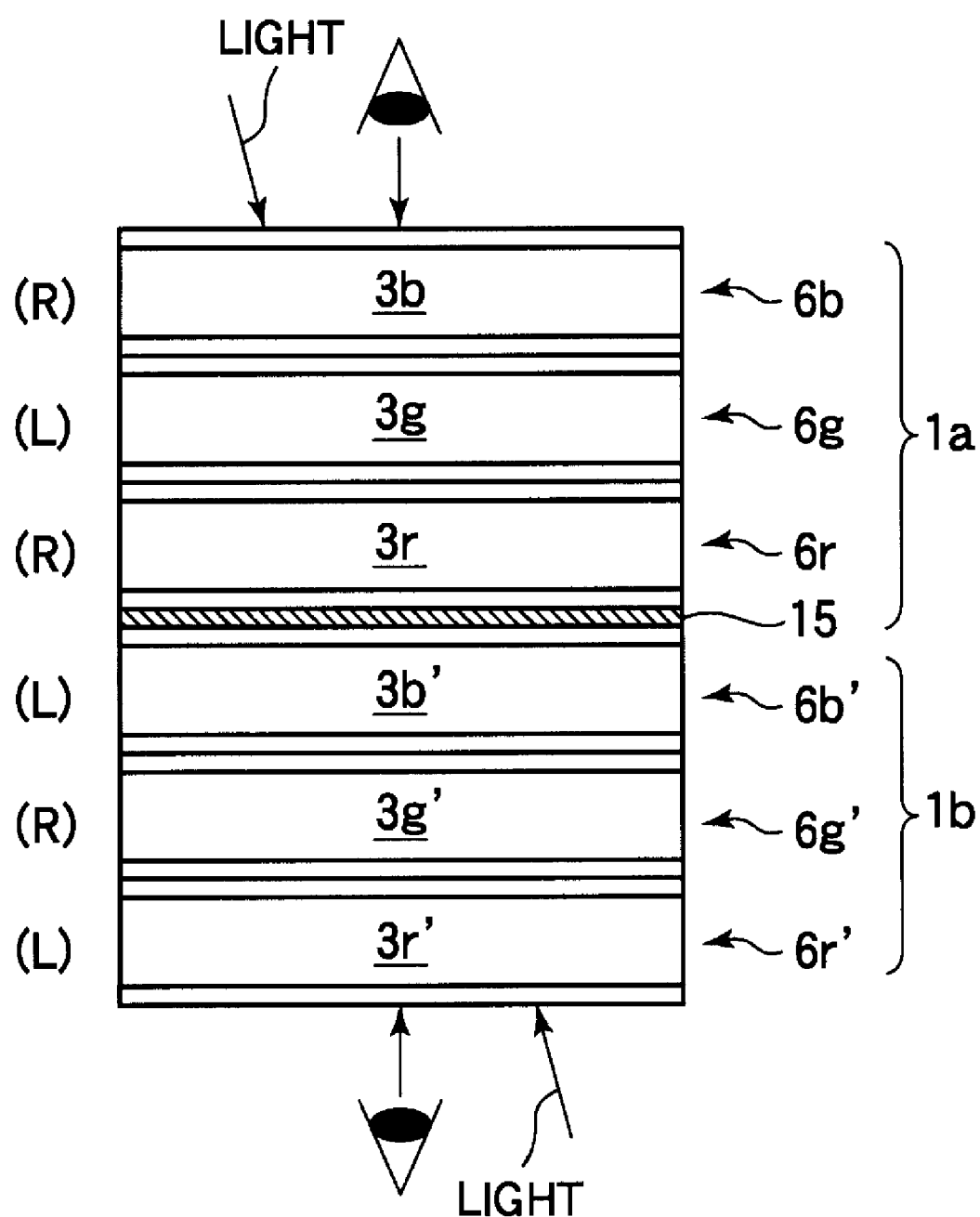
FIG. 12 is a schematic view of a section of the liquid crystal display 1 according to the first embodiment taken when displaying an image in a two-surface display mode.

FIG. 12 is a schematic view of a section of the liquid crystal display 1 when displaying an image in the two-surface display mode. When the liquid crystal display 1 of the present embodiment is in the two-surface display mode, the first display unit 1a is located on one side of the light absorbing layer 15, and the second display unit 1b is located on the other side of the light absorbing layer 15. More specifically, the first liquid crystal display elements 6r, 6g, and 6b are stacked in the order listed on one side of the light absorbing layer 15, and the second liquid crystal display elements 6b', 6g', and 6r' are stacked in the order listed on the other side of the light absorbing layer 15. Thus, three layers are stacked on each side. In order to suppress reflections at an interface between a surface of the light absorbing layer 15 on the other side thereof and the second display unit 1b, an anti-reflection film AR constituted by a dielectric multi-layer film or the like may obviously be formed on a surface of the second liquid crystal display element 6b'.

In the two-surface display mode, two different images can be simultaneously displayed, although the display has a reflectance similar to that in the related art. As thus described, the present embodiment makes it possible to provide a liquid crystal display on which a high reflectance can be achieved and which is less limited by the number of display surfaces.

Methods of driving the liquid crystal display 1 in the high image quality mode and the two-surface display mode will now be described with reference to FIGS. 13 to 17B. In the present embodiment, since the row electrode driving circuit 25 is shared by the first and second display units 1a and 1b, different driving methods are used when both of images displayed on the first display unit 1a and the second display unit 1b are simultaneously rewritten and when content displayed on one of the display units is rewritten with content displayed on the other unit kept unchanged. The following description is on an assumption that general-purpose STN drivers are used.

Figure 13:
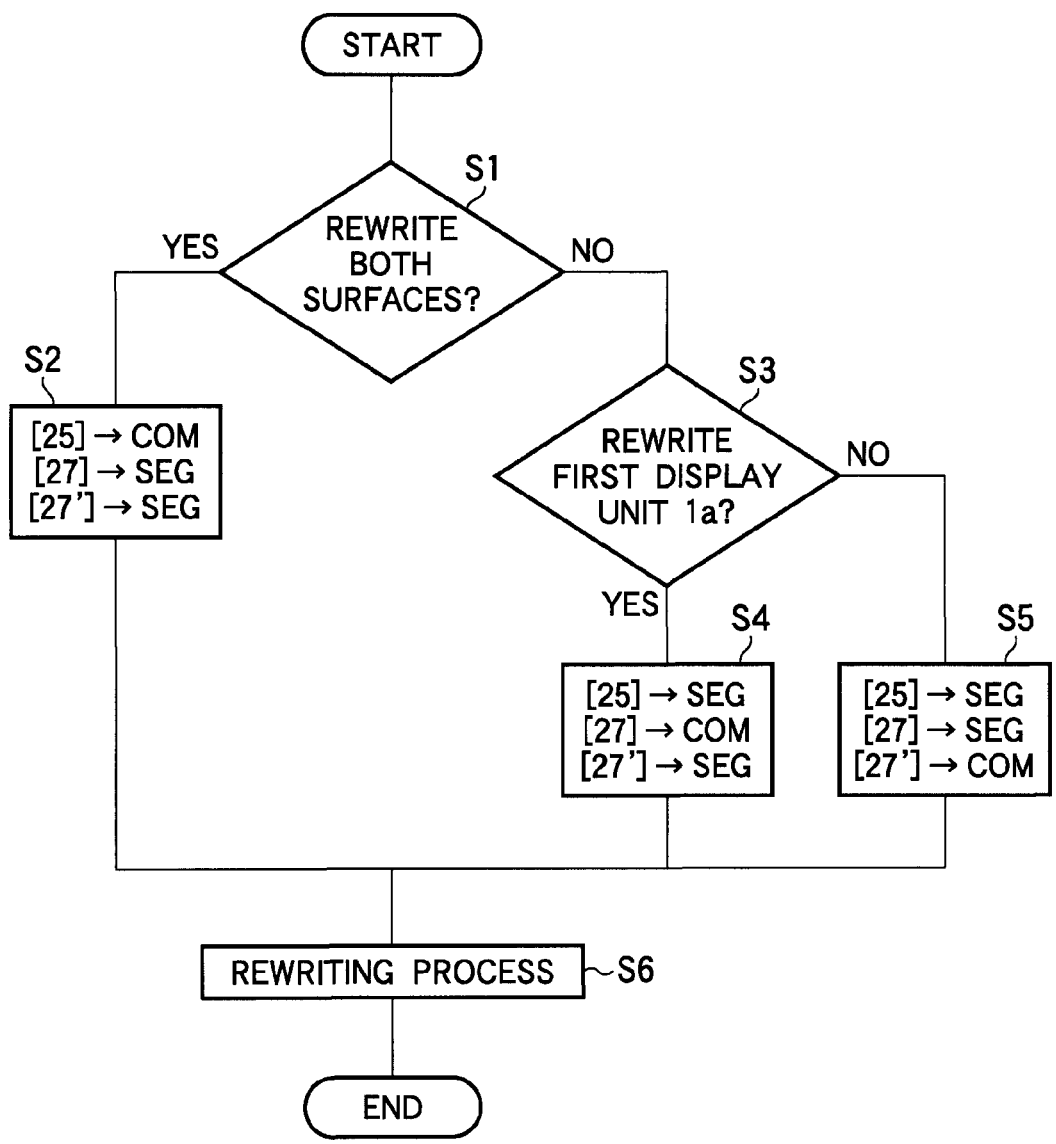
FIG. 13 is a flow chart showing steps of an image rewrite performed according to the first embodiment.

FIG. 13 is a flow chart showing steps of an image rewrite performed according to the present embodiment. FIGS. 14A to 16B show examples of voltages applied to row and column electrodes and driving voltages applied to each pixel during an image rewrite process.

In FIGS. 13 to 16B, the row electrode driving circuit 25 is represented by [25]; the column electrode driving circuit 27 is represented by [27]; and the column electrode driving circuit 27' is represented by [27']. "COM" represents the scan electrode driving circuit, and "SEG" represents the data electrode driving circuit. In FIGS. 14A to 16B, "ON-SEG" represents a high luminance data voltage applied to a data electrode, and "OFF-SEG" represents a low luminance data voltage applied to a data electrode. "ON-COM" represents a pulse voltage applied to a selected scan electrode, and "OFF-COM" represents a pulse voltage applied to an unselected scan electrode.

"ON-COM(SEG mode)" represents a pulse voltage applied to a data electrode at which no image rewrite is to take place when the electrode is selected, and "OFF-COM(SEG mode)" represents a pulse voltage applied to a data electrode at which no image rewrite is to take place when the electrode is not selected. In the present embodiment, the pulse voltages applied in the "ON-COM(SEG mode)" and the "(OFF-COM (SEG mode)" are identical, and the pulse voltage has voltage values of 28 V and 4 V in the first and second halves of the pulse application period, respectively. In the present embodiment, the pulse voltage in the "ON-COM(SEG mode)" and the "(OFF-COM(SEG mode)" will be referred to as "non-rewrite applied voltage".

"Select ON" represents a driving voltage for a selected pixel associated with a data electrode to which the high luminance data voltage is applied. "Select OFF" represents a driving voltage for a selected pixel associated with a data electrode to which the low luminance data voltage is applied. "Unselect ON" represents a driving voltage for an unselected pixel associated with a data electrode to which the high luminance data voltage is applied. "Unselect OFF" represents a driving voltage for an unselected pixel associated with a data electrode to which the low luminance data voltage is applied.

The control circuit section 23 detects the state of the display mode select switch 1a3 to determine the mode of the display, i.e., the high image quality mode or the two-surface display mode. The section also analyses image data input from a system which is not shown to determine which of images on the first and second display units 1a and 1b is to be rewritten.

For example, to rewrite an image in the high image quality mode, images on both of the first and second display units 1a and 1b must be rewritten. When the display is switched from the two-surface display mode to the high image quality mode, an image displayed on the first display unit 1a is kept unchanged, and an image displayed on the second display unit 1*b* must be rewritten into an image that is identical to the image on the first display unit 1*a*.

In the two-surface display mode, it may be required to rewrite different images on the first and second display units 1*a* and 1*b* at substantially the same time, and an image rewrite may alternatively be required only for either of the first and second display units 1*a* and 1*b*.

When it is determined that an image rewrite is required, the control circuit section 23 executes the image rewrite processing steps shown in FIG. 13. As shown in FIG. 13, the control circuit section 23 first determines whether a rewrite is required for the two display surfaces (step S1). When it is determined that a rewrite is required for the two display surfaces, the control circuit section 23 sets the driving circuits 25, 27, and 27' such that the column electrode driving circuits 27 and 27' of the first and second display units la and 1*b* will function as data electrode driving circuits and such that the row electrode driving circuit 25 shared by the first and second display units 1*a* and 1*b* will function as a scan electrode driving circuit (step S2).

Then, an image rewriting process at step S6 is started. At the image rewriting process of step S6, pixels are driven by pulse voltages set as shown in FIGS. 14A and 14B. The column electrodes 19 of the first liquid crystal display elements 3*r*, 3*g*, and 3*b* for the respective colors of the first display unit 1*a* function as data electrodes. As shown in FIG. 14A, a predetermined image data voltage (ON-SEG or OFF-SEG) is applied to each column electrode 19 from the column electrode driving circuit 27 which functions as a data electrode driving circuit.

The column electrodes 19' of the second liquid crystal display elements 3*r*', 3*g*', and 3*b*' for the respective colors of the second display unit 1*b* function as data electrodes. As shown in FIG. 14B, a predetermined image data voltage (ON-SEG or OFF-SEG) is applied to each column electrode 19' from the column electrode driving circuit 27' which functions as a data electrode driving circuit.

Each time a predetermined data voltage is applied to each of the plurality of column electrodes 19 and the plurality of column electrodes 19' as shown in FIGS. 14A and 14B, the same rows of the row electrodes 17 and 17' of the first and second display units 1*a* and 1*b* are selected on a line sequential basis (scanned on a line sequential basis) by the shared row electrode driving circuit 25 functioning as a scan electrode driving circuit. Thus, images on both of the first and second display units 1*a* and 1*b* are simultaneously rewritten. Images on the two display surfaces are simultaneously rewritten as thus described. The applied voltages and driving voltages shown in FIGS. 14A and 14B are the same as those shown in the timing chart shown in FIGS. 7A and 7B.

When the image rewriting process at step S6 is performed in the high image quality mode, the same image data voltage is applied to the same rows of the plurality of column electrodes 19 and 19' of the first and second display units 1*a* and 1*b*. In the two-surface display mode, in general, different image data voltages are applied to the same rows of the plurality of column electrodes 19 and 19' of the first and second display units 1*a* and 1*b*. In the two-surface display mode, image data voltages are applied to the plurality of column electrodes 19' with the column addresses of the electrodes inverted such that the column addresses become the reverse of the column addresses of the plurality of column electrodes 19. Thus, an image on the second display unit 1*b* is prevented from being displayed inverted in the two-surface display mode.

When the control circuit section 23 determines at step S1 that a two-surface image rewrite is not required, the section further determines which of the images on the first and second display units 1*a* and 1*b* is to be rewritten (step S3). When only the image on the first display unit 1*a* is to be rewritten, step S4 is executed. When only the image on the second display unit 1*b* is to be rewritten, step S5 is executed.

When only the image on the first display unit 1*a* is to be rewritten, the control circuit section 23 sets the driving circuits 25, 27, and 27' as follows (step S4). The column electrode driving circuit 27 is set to function as a scan electrode driving circuit such that the column electrodes 19 of the first display unit 1*a* will operate as scan electrodes. The shared row electrode driving circuit 25 is set to function as a data electrode driving circuit such that the row electrodes 17 and 17' will operate as data electrodes. The column electrode driving circuit 27' of the second display unit 1*b* is set to function as a data electrode driving circuit which supplies a non-rewrite applied voltage to the column electrodes 19'.

Then, the image rewriting process at step S6 is started. At the image rewriting process of step S6, pixels are driven by pulse voltages set as shown in FIGS. 15A and 15B. As shown in FIGS. 15A and 15B, the row electrodes 17 and 17' of the first liquid crystal display elements 6*r*, 6*g*, 6*b* and the second liquid crystal display elements 6*r*', 6*g*', and 6*b*' for the respective colors of the first and second display units 1*a* and 1*b* function as data electrodes. A predetermined image data voltage (ON-SEG or OFF-SEG) is applied to each of the row electrodes 17 and 17' from the row electrode driving circuit 25 functioning as a data electrode driving circuit. The same image data voltage of applied to the row electrodes 17 and 17' having the same row address.

Each time a predetermined data voltage is applied to each of the plurality of row electrodes 17 as shown in FIG. 15A, the column electrode 19 of the first display unit 1*a* is selected on a line sequential basis (scanned on a line sequential basis) by the column electrode driving circuit 27 functioning as a scan electrode driving circuit. Thus, the image on the first display unit 1*a* is rewritten.

On the contrary, as shown in FIG. 15B, when a predetermined data voltage is applied to each of the plurality of row electrodes 17', a non-rewrite voltage (which is at 28 V and 4 V in the first and second halves thereof, respectively) is applied to each column electrode 19' from the column electrode driving circuit 27' functioning as a data electrode driving circuit. As a result, both of selected pixels and unselected pixels of the second display unit 1*b* are driven by a very low voltage having a pulse voltage value of +4 V or less, and the image existing on the second display unit 1*b* is maintained without being rewritten.

Operations performed at step S5 followed by step S6 to rewrite only the image on the second display unit 1*b* are similar to those performed at step S4 followed by step S6. Therefore, the operations is omitted from the description with examples of voltages applied to the row and column electrodes and voltage values of driving voltages applied to the pixels during the operations shown in FIGS. 16A and 16B.

FIGS. 17A and 17B illustrate steps for addressing image data when the row electrode driving circuit 25 and the column electrode driving circuit 27 are switched to function as a data electrode driving circuit and a scan electrode driving circuit, respectively. FIGS. 17A and 17B schematically illustrate the first liquid crystal display element 6*b* for blue of the first display unit 1*a* by way of example. FIG. 17A shows a case in which the row electrode driving circuit 25 functions as a scan electrode driving circuit and the column electrode driving circuit 27 functions as a data electrode driving circuit. In this case, the control circuit section 23 defines coordinates of the illustrated image data i in the left-to-right direction from a coordinate (0,0) at the top left end of the image up to a coordinate (0,n) and outputs image data to column electrodes 19 at addresses 0 to n from the column electrode driving circuit 27.

FIG. 17B shows a case in which the column electrode driving circuit 27 functions as a scan electrode driving circuit and the row electrode driving circuit 25 functions as a data electrode driving circuit. In this case, the control circuit section 23 converts the coordinates of the image data i in FIG. 17A to define coordinates in the left-to-right direction from a coordinate (0,0) at the top left end of the image up to a coordinate (0,m) and outputs image data to row electrodes 17 at addresses 0 to m from the row electrode driving circuit 25. Thus, an image can be properly displayed in either the driving setup shown in FIGS. 14A and 14B or the setup shown in FIGS. 15A and 15B. The operations shown in FIGS. 17A and 17B can be similarly performed to display an image properly also in the driving setup shown in FIGS. 16A and 16B in which the column electrode driving circuit 27' functions as a scan electrode driving circuit and the row electrode driving circuit 25 functions as a data electrode driving circuit.

When the display has a high image rewriting speed allowing an image rewrite to be performed in such an instantaneous manner that the image rewrite is not annoying for the viewer even if it is extended to a retained image, the above-described alternative image rewiring methods may obviously be unified into a procedure including only steps S1, S2, and S6 shown in FIG. 13.

Figure 18C:
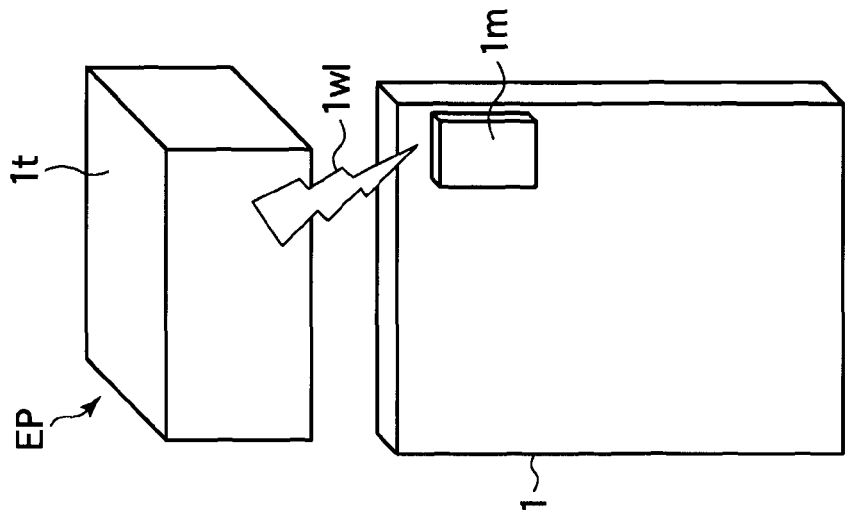
FIGS. 18A to 18C are illustrations showing specific examples of electronic paper EP having a liquid crystal display 1 according to the first embodiment.
Figure 18B:
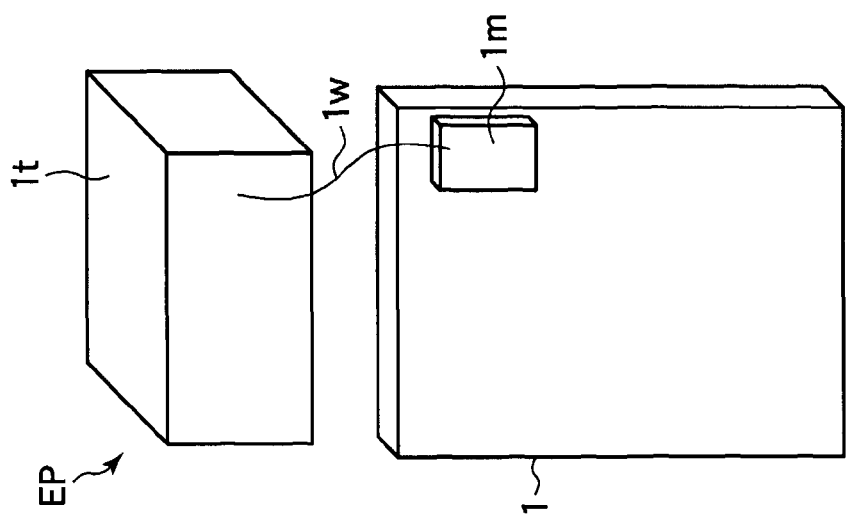
Figure 18A:
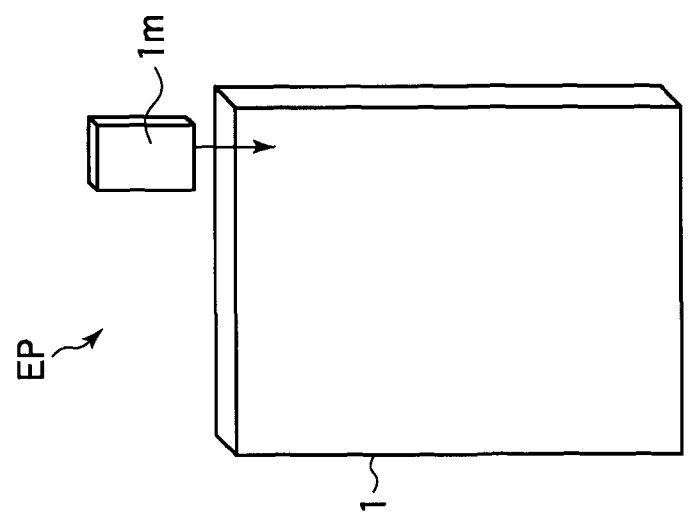

FIGS. 18A to 18C show specific examples of electronic paper EP having a liquid crystal display 1 according to the present embodiment. FIG. 18A shows electronic paper EP which is configured to use a non-volatile memory 1m having image data stored therein in advance by inserting and removing it to and from the picture frame section 1a2 of the liquid crystal display 1 according to the embodiment. For example, image data in a personal computer or the like is stored in the non-volatile memory 1m, and the memory is inserted into the electronic paper EP. Thus, an image can be displayed by selecting either of the above-described high image quality mode and two-surface display mode.

FIG. 18B shows electronic paper EP configured by incorporating a non-volatile memory 1m in the picture frame section 1a2 of a liquid crystal display 1 according to the embodiment. For example, image data stored in a terminal 1t (the terminal 1t may form a part of the electronic paper EP) is transferred by wire and stored in the non-volatile memory 1m. Thus, an image can be displayed by selecting either of the above-described high image quality mode and two-surface display mode.

FIG. 18C shows an example in which a wireless transmission/reception system (e.g., a radio LAN or Bluetooth system) is provided between a terminal 1t and a liquid crystal display 1. Image data stored in the terminal 1t may be transferred through wireless transmission/reception 1w1 and stored in a non-volatile memory 1m. Thus, an image can be displayed by selecting either of the above-described high image quality mode and two-surface display mode.

Second Embodiment

A liquid crystal display 1 and electronic paper EP having the display according to a second embodiment will now be described with reference to FIGS. 19A to 19D. Members which are identical in configuration and functions between the liquid crystal display 1 of the present embodiment and the display of the first embodiment are indicated by like reference numerals, and such members will not be described. The liquid crystal display 1 of the present embodiment includes no hinge section 2 unlike the configuration of the first embodiment in which the first and second display units 1a and 1b are rotated relative to each other about the hinge section 2 to allow switching between the high image quality mode and two-surface display mode. The present embodiment has a configuration in which a second display unit 1b is attached and detached to and from a first display unit 1a.

Figure 19A:
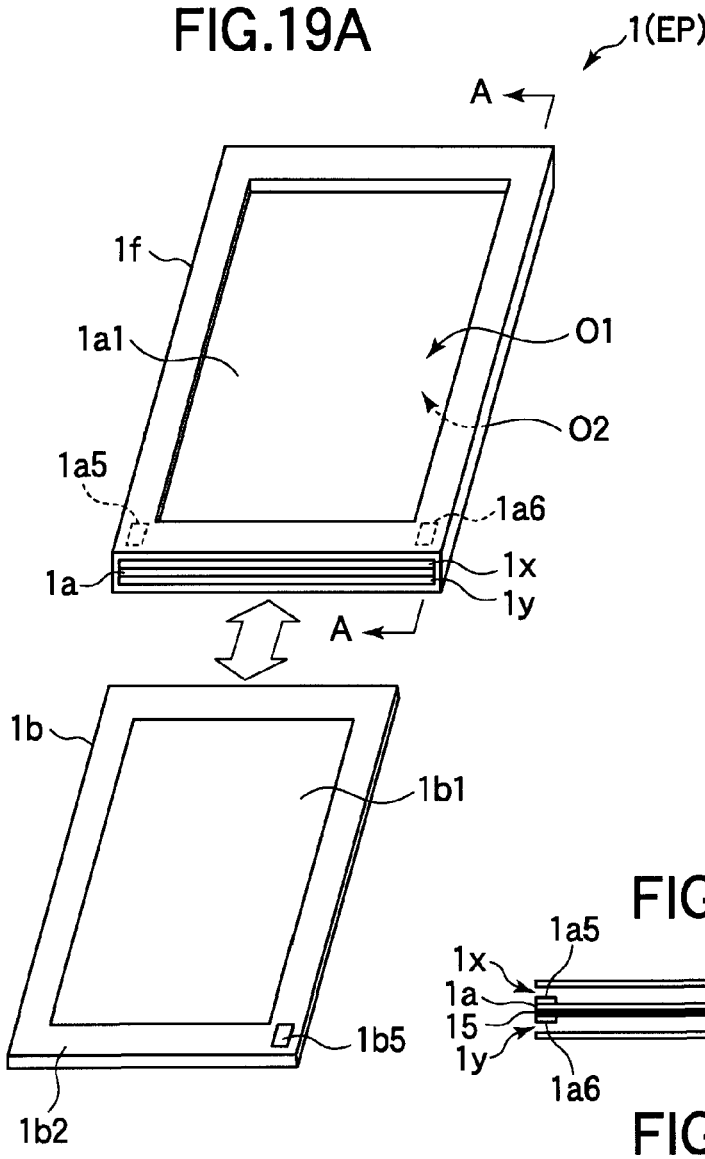
FIGS. 19A to 19D are illustrations of a liquid crystal display 1 and electronic paper EP having the display according to a second embodiment.
Figure 19B:
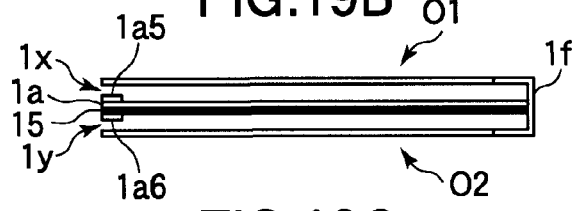

FIG. 19A is an external perspective view of a liquid crystal display 1 (or electronic paper EP) according to the present embodiment. FIG. 19B is a schematic view of an end face of the display taken along the line A-A in FIG. 19A. As shown in FIGS. 19A and 19B, a first display unit 1a is housed and secured substantially in the middle of a frame section 1f having an opening O1 provided in an image display area 1a1 thereof and another opening O2 provided on the side of display opposite to the display area.

A slot portion 1x is provided on one side of the frame section 1f which has an outline in the form of a thin rectangular body, the slot portion being located on the side the first display unit 1a facing toward the image display area 1a1. Another slot portion 1y is provided on the opposite side of the display unit facing toward a light absorbing layer 15 of the display. A second display unit 1b can be inserted through either of the slot portions 1x and 1y and secured in the frame section 1f.

A signal input/output terminal portion 1a5 is provided at the end of the first display unit 1a on the side of the slot portion 1x. A signal input/output terminal portion 1a6 is also provided at the end of the first display unit 1a on the side of the slot portion 1y. The signal input/output terminal portions 1a5 and 1a6 are used for supplying various control signals, image data signals, and power to the second display unit 1b inserted through the slot portion 1x or 1y.

As shown in FIG. 19A, the second display unit 1b of the present embodiment is configured to be supplied with power and to transmit and receive various data signals through the signal input/output terminal portion 1b5 provided at a corner of the picture frame section 1b2, whereas the first embodiment is configured to be supplied with power and to transmit and receive various data signals through the hinge section 2.

Figure 19C:

FIG. 19A is a view of the liquid crystal display 1 having such a configuration showing taken when inserting the second display unit 1b into the slot portion 1y of the frame section 1f. FIG. 19C is a partial sectional view of the display showing a state in which the second display unit 1b is inserted and secured in the frame portion 1f. When the second display unit 1b is inserted through the slot portion 1y such that the signal input/output terminal portion 1b5 is visible as shown in FIG. 19A, the two signal input/output terminal portions 1a6 and 1b5 are put in contact and electrical connection with each other as shown in FIG. 19C.

A control circuit section 23, which is not shown, determines that the display is in the two-surface display mode from this state of connection and takes steps similar to those in the first embodiment to display images on the first and second display units 1a and 1b in the two-surface display mode. A viewer can view the image on the first display unit 1a through the opening O1 of the frame section 1f, and the viewer can view the image on the second display unit 1b through the opening O2 by turning the frame section 1f upside down.

Figure 19D:
Figure 20:
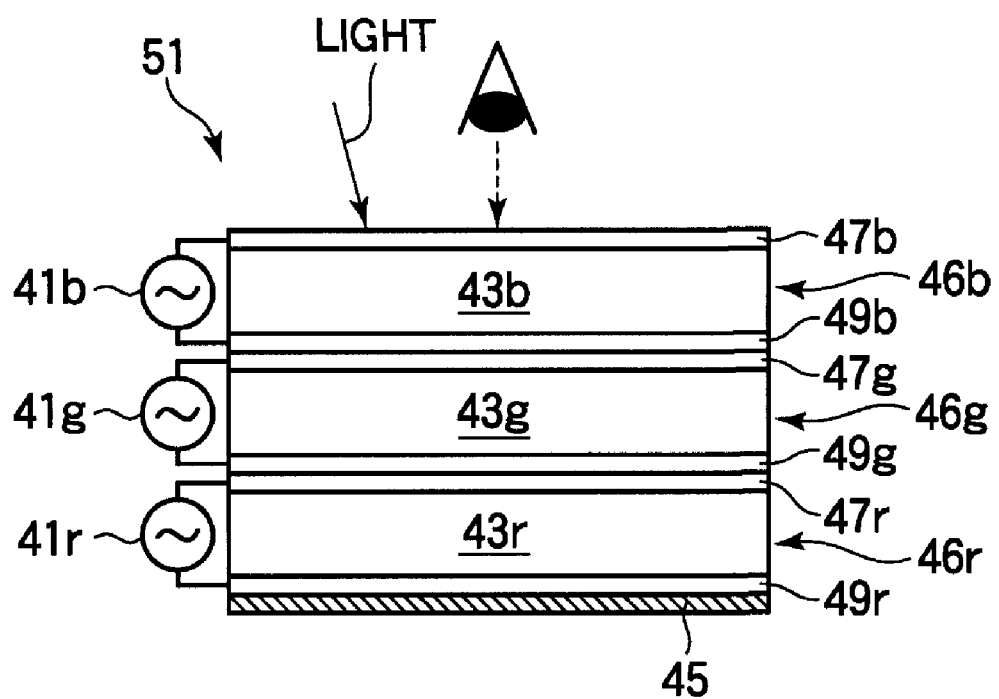
FIG. 20 is an illustration schematically showing a sectional configuration of a liquid crystal display according to the related art.
Figure 21A:
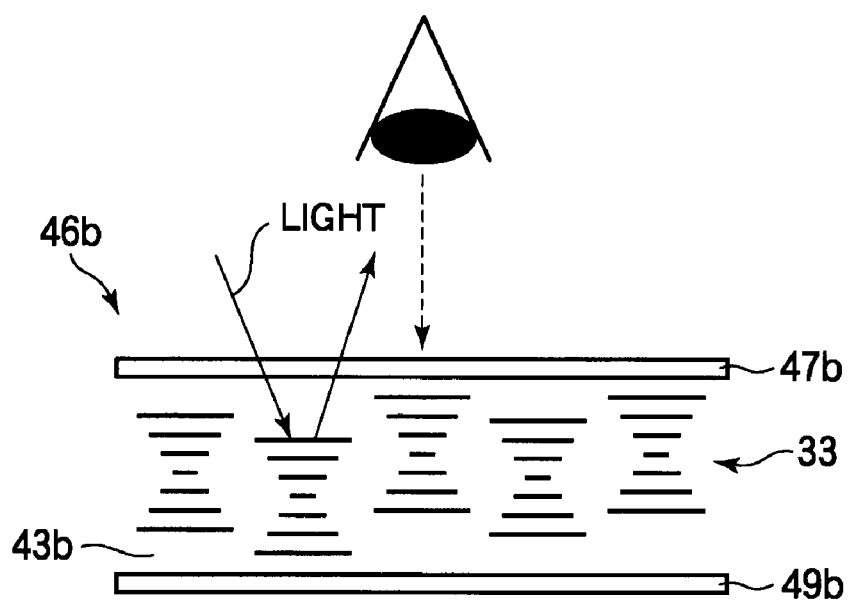
FIGS. 21A and 21B are illustrations schematically showing sectional configurations of a liquid crystal display according to the related art.
Figure 21B:
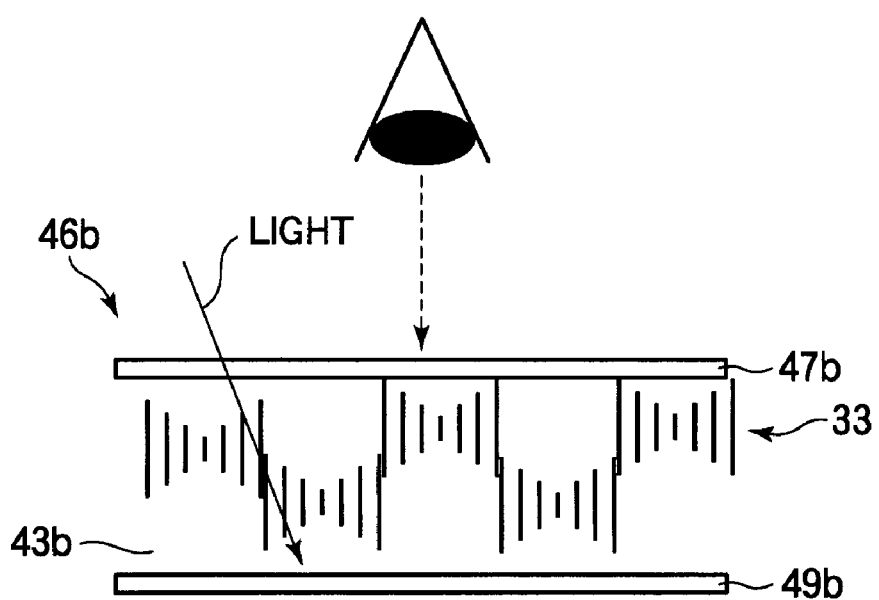

When the second display unit 1b is turned upside down from the state shown in FIG. 19A to insert the second display unit 1b through the slot portion 1x such that the signal input/output terminal portion 1b5 is invisible, the two signal input/output terminal portions 1a5 and 1b5 are put in contact and electrical connection with each other as shown in FIG. 19D.

The control circuit section 23, which is not shown, determines that the display is in the high image quality mode from this state of connection and takes steps similar to those in the first embodiment to display images on the first and second display units 1a and 1b in the high image quality mode. The viewer can view an image of high quality through the opening O1 of the frame section 1f.

When a detachable configuration as in the present embodiment is used, it is difficult to establish reliable electrical connection for all of hundreds or thousands of output terminals of driving circuits. It is therefore difficult to use a driving circuit on a shared basis as in the first embodiment. For this reason, each of the first and second display units 1a and 1b of the present embodiment preferably is provided with both of a scan electrode driving circuit and a data electrode driving circuit. A power supply circuit and a control circuit are provided at the first display unit 1a, and input signals from several tens drivers are transferred to the second display unit 1b through the signal input/output terminal portion 1b5.

In the present embodiment, since a layer of air is formed between the first display unit 1a and the second display unit 1b, the contrast of the display tends to be degraded by interfacial reflections. The degradation of contrast attributable to interfacial reflections can be suppressed by forming an anti-reflection film on a surface of each of the display units 1a and 1b.

As described above, according to the above-described embodiments, a color display element having an RGB multilayer structure utilizing cholesteric liquid crystals can be functionally switched to display an image with high quality comparable to quality achieved on printed matters or to display images on two surfaces and can be greatly improved in applications and usefulness of the electric paper. For example, the function of enabling switching between the high image quality mode and the two-surface display mode is advantageous in that those modes can be switched according to contents to be displayed such as restaurant menus, data used for conferences, and leaflets.

The invention is not limited to the above-described embodiments and may be modified in various ways.

For example, in the above description of the embodiments, the first display unit 1a has the first liquid crystal display elements 6b, 6g, and 6r stacked one over another in the form of a three-layer structure for displaying blue, green, and red. However, the invention is not limited to such a structure, and the first liquid crystal display elements may have one layer, two layers or four or more layers. Similarly, the second liquid crystal display elements of the second display unit 1b may have one layer, two layers, or four or more layers.

In the above description of the embodiments, the first display unit 1a described as an example includes the first liquid crystal display elements 6b, 6g, and 6r having first liquid crystals 3b, 3g, and 3r reflecting blue, green, and red rays of light in the planar state. However, the invention is not limited to such a display unit, and the display unit 1a may have three layers constituted by first liquid crystal display elements having liquid crystals reflecting cyan, magenta, and yellow rays of light in the planar state. Similarly, the second display unit 1b may have liquid crystals reflecting cyan, magenta, and yellow rays of light in the planar state.

Although the above embodiments have been described on an assumption that they are used in QVGA display mode, the invention is not limited to such a display mode and may obviously be used in the VGA mode and other display modes at higher resolutions.

Although the display mode select switch 1a3 constituted by a mechanical button is used in the first embodiment, the invention is not limited to such a switch. Obviously, a light-receiving element may be used as the display mode select switch 1a3 instead of a mechanical button, and switching between an on-state and an off-state may be enabled by a change in the quantity of light incident on the light-receiving element which occurs depending on whether a light-receiving surface of the light-receiving element is obscured by the picture frame portion 1b2 of the second display unit 1b or not.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A liquid crystal display comprising:
   a first display unit having a first liquid crystal display element including a first liquid crystal selectively reflecting light in a predetermined color in a predetermined state enclosed between substrates provided opposite to each other;
   a second display unit having a second liquid crystal display element including a second liquid crystal selectively reflecting light in the predetermined color in the predetermined state enclosed between substrates provided opposite to each other;
   a light absorbing layer disposed on a bottom surface of the first display unit so as to absorb light which has entered the first display unit through a top surface thereof and which has been transmitted by the first liquid crystal; and
   a control circuit section for effecting a switch between a two-surface display mode in which the second display unit is lapped over the first display unit so as to face the bottom surface thereof with the light absorbing layer interposed between them to display images independent of each other on the first display unit and the second display unit and a high image quality mode in which the second display unit is lapped over the first display unit so as to face the top surface thereof to display the same image on the first and second display units.

2. The liquid crystal display according to claim 1, wherein the first and second liquid crystals include a liquid crystal which forms a cholesteric phase.

3. The liquid crystal display according to claim 2, wherein the first and second liquid crystals are different from each other in optical rotatory power.

4. The liquid crystal display according to claim 3, wherein:
   the first display unit includes a plurality of the first liquid crystal display elements formed one over another; and
   the second display unit includes a plurality of the second liquid crystal display elements formed one over another, the number of the elements being the same as the number of the first liquid crystal display elements.

5. The liquid crystal display according to claim 4, wherein:
   the first display unit has three layers formed by stacking the first liquid crystal display elements; and
   the optical rotatory power of the first liquid crystal in the middle layer is different from the optical rotatory power of the first liquid crystals in the top and bottom layers.

6. The liquid crystal display according to claim 5, wherein:
the second display unit has three layers formed by stacking the second liquid crystal display elements; and
the optical rotatory power of the second liquid crystal in the middle layer is different from the optical rotatory power of the second liquid crystals in the top and bottom layers.

7. The liquid crystal display according to claim 6, wherein the optical rotatory power of the second liquid crystal in the middle layer of the second display unit is different from the optical rotatory power of the first liquid crystal in the middle layer of the first display unit.

8. The liquid crystal display according to claim 7, wherein:
the optical rotatory power of the second liquid crystal in the top layer of the second display unit is different from the optical rotatory power of the first liquid crystal in the top layer of the first display unit; and
the optical rotatory power of the second liquid crystal in the bottom layer of the second display unit is different from the optical rotatory power of the first liquid crystal in the bottom layer of the first display unit.

9. The liquid crystal display according to claim 8, wherein:
the first and second liquid crystals in the top layers of the first and second display units selectively reflect blue light in a planar state;
the first and second liquid crystals in the middle layers selectively reflect green light in the planar state; and
the first and second liquid crystals in the bottom layers selectively reflect red light in the planar state.

10. The liquid crystal display according to claim 1, wherein an anti-reflection film is formed on a surface of at least either of the first display unit and the second display unit.

11. The liquid crystal display according to claim 1, further comprising a hinge section rotatably connecting the first display unit and the second display unit.

12. The liquid crystal display according to claim 11, further comprising a display mode select switch outputting a select signal for effecting a switch between the high image quality mode and the two-surface display mode to the control circuit section.

13. The liquid crystal display according to claim 1, wherein the second display unit can be attached and detached to and from the first display unit.

14. The liquid crystal display according to claim 1, comprising:
a plurality of row electrodes and a plurality of column electrodes disposed on the opposite substrates of each of the first and second liquid crystal display elements such that they face each other in an intersecting relationship;
a row electrode driving circuit applying a predetermined voltage to the plurality of row electrodes; and
a column electrode driving circuit applying a predetermined voltage to the plurality of column electrodes.

15. The liquid crystal display according to claim 14, wherein a pair of the row and column electrode driving circuits is separately provided in each of the first display unit and the second display unit.

16. The liquid crystal display according to claim 14, wherein:
the column electrode driving circuit is separately provided in each of the first display unit and the second display unit; and
the row electrode driving circuit is provided such that it is shared by the first display unit and the second display unit.

17. The liquid crystal display according to claim 16, wherein, the control circuit section enables rewriting of images on both of the first display unit and the second display unit by causing the column electrode driving circuits of the first and second display units to function as data electrode driving circuits and causing the shared row electrode driving circuit to function as a scan electrode driving circuit.

18. The liquid crystal display according to claim 16, wherein the control circuit section enables rewriting of only an image on either of the first and second display units by:
causing the column electrode driving circuit of the one of the first and second display units to function as a scan electrode driving circuit such that the column electrodes of the one display unit will serve as scan electrodes;
causing the shared row electrode driving circuit to function as a data electrode driving circuit such that the row electrodes will serve as data electrodes; and
causing the column electrode driving circuit of the other of the first and second display units to function as a data electrode driving circuit for supplying a non-rewrite applied voltage to the column electrodes of the other display unit.

19. The liquid crystal display according to claim 14, wherein general-purpose STN drivers are used in the row electrode driving circuits and the column electrode driving circuits.

20. Electronic paper displaying an image, comprising a liquid crystal display according to claim 1.

* * * * *